(12) United States Patent
Yahata et al.

(10) Patent No.: US 8,284,638 B2
(45) Date of Patent: Oct. 9, 2012

(54) DISC DRIVE

(75) Inventors: Hiroshi Yahata, Osaka (JP); Shinichi Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 334 days.

(21) Appl. No.: 11/915,226

(22) PCT Filed: May 25, 2006

(86) PCT No.: PCT/JP2006/310460
§ 371 (c)(1),
(2), (4) Date: Nov. 21, 2007

(87) PCT Pub. No.: WO2006/126640
PCT Pub. Date: Nov. 30, 2006

(65) Prior Publication Data
US 2009/0073598 A1    Mar. 19, 2009

(30) Foreign Application Priority Data
May 25, 2005    (JP) ................. 2005-152102

(51) Int. Cl.
*G11B 7/085*    (2006.01)
(52) U.S. Cl. .................. 369/30.03
(58) Field of Classification Search ........... 369/30.03
See application file for complete search history.

(56) References Cited

U.S. PATENT DOCUMENTS

| | | | | |
|---|---|---|---|---|
| 5,995,471 A | * | 11/1999 | Saoyama et al. | 369/47.13 |
| 2002/0097645 A1 | * | 7/2002 | Mikawa | 369/47.1 |
| 2005/0019522 A1 | | 1/2005 | McClellan | |
| 2007/0284271 A1 | * | 12/2007 | Anzai et al. | 206/308.1 |

FOREIGN PATENT DOCUMENTS

| | | |
|---|---|---|
| JP | 05-054460 | 3/1993 |
| JP | 10-124982 | 5/1998 |
| JP | 2001-143437 | 5/2001 |
| JP | 2003-331560 | 11/2003 |
| JP | 2003331560 A | * 11/2003 |
| JP | 2005-044502 | 2/2005 |
| WO | 2004/109696 A1 | 12/2004 |

OTHER PUBLICATIONS

International Search Report for corresponding Application No. PCT/JP2006/310460 dated Jul. 18, 2006.
PCT/ISA/237 and partial English translation.
Notice of Reasons for Rejection for corresponding Japanese Patent Application No. 2007-517896 issued Jul. 27, 2010 and English translation.

* cited by examiner

*Primary Examiner* — Joseph Feild
*Assistant Examiner* — Henok Heyi
(74) *Attorney, Agent, or Firm* — Renner, Otto, Boisselle & Sklar, LLP

(57) ABSTRACT

A storage medium with electronic paper is provided with a disk drive that can refresh the display on the electronic paper using a simple arrangement.

A disk drive includes a motor that generates rotational force and a drive shaft support for clamping a disk thereon by contacting with the disk and for turning the disk thereon by the rotational force. The drive shaft support includes at least one output terminal for outputting an electrical signal. If the disk includes electronic paper on which the display is refreshable in response to the electrical signal, the at least one output terminal of the disk drive is arranged so as to contact with at least one input terminal that is arranged on the disk to supply the electrical signal to the electronic paper.

14 Claims, 24 Drawing Sheets

FIG.6
(a)
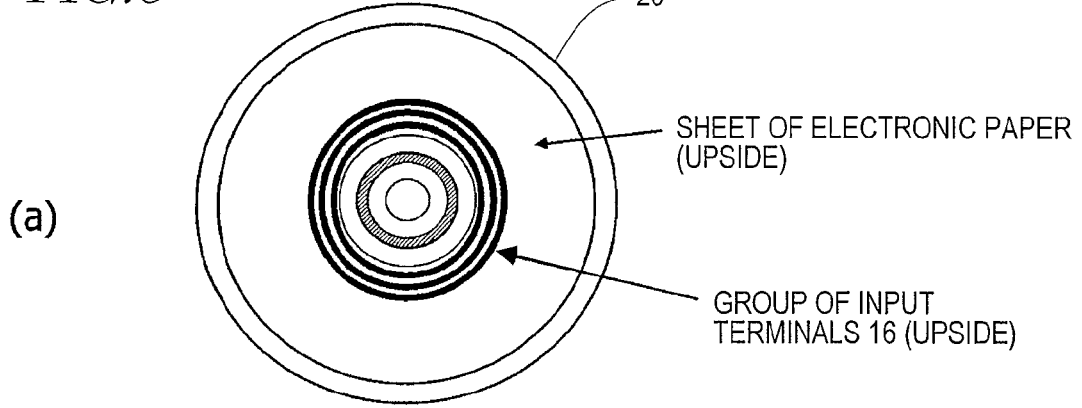
(b)
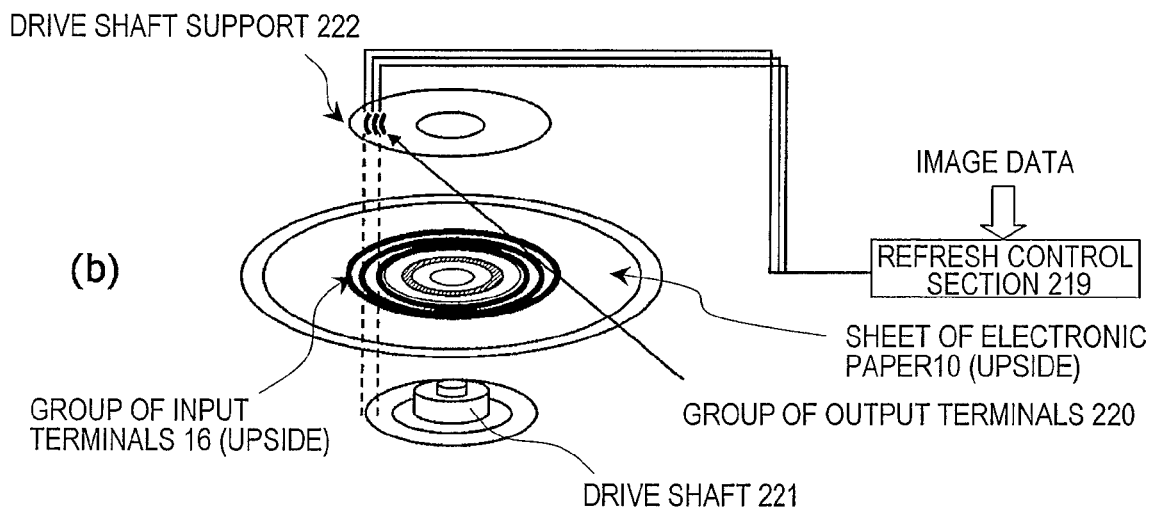

FIG.8
(a) 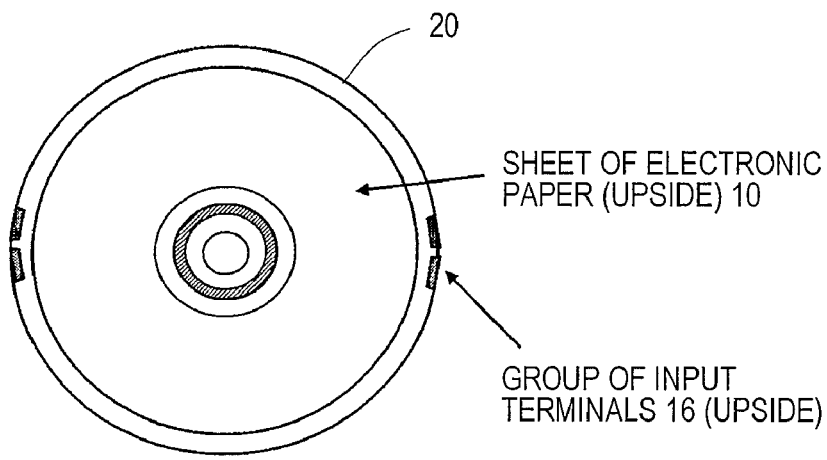
(b) 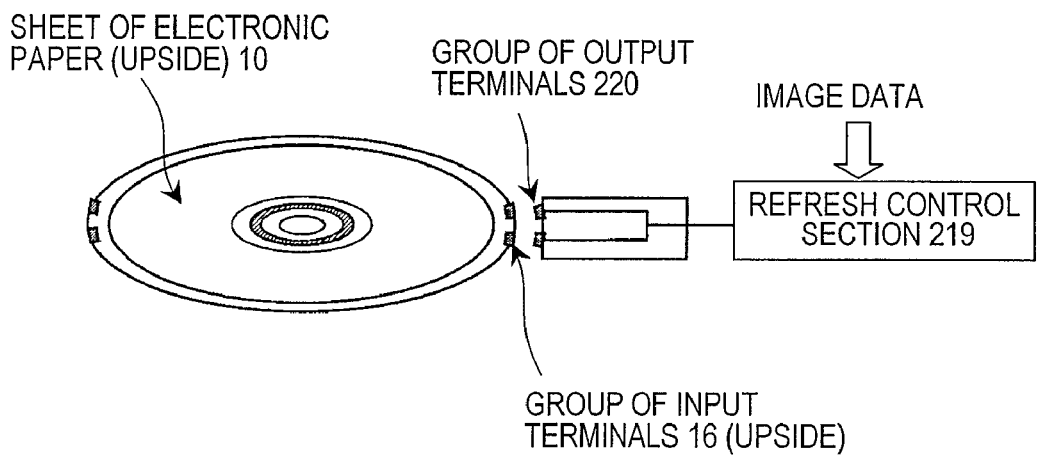

FIG.30
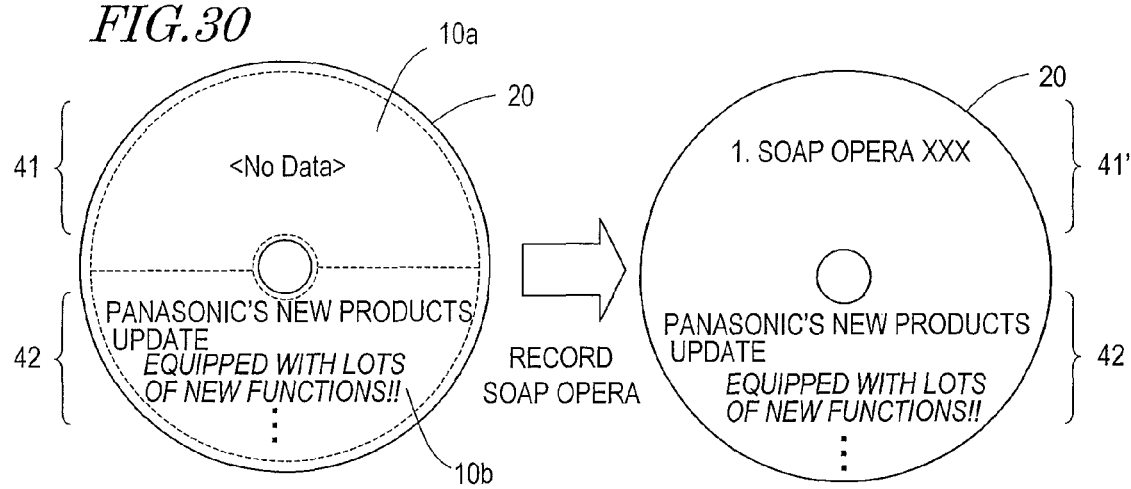
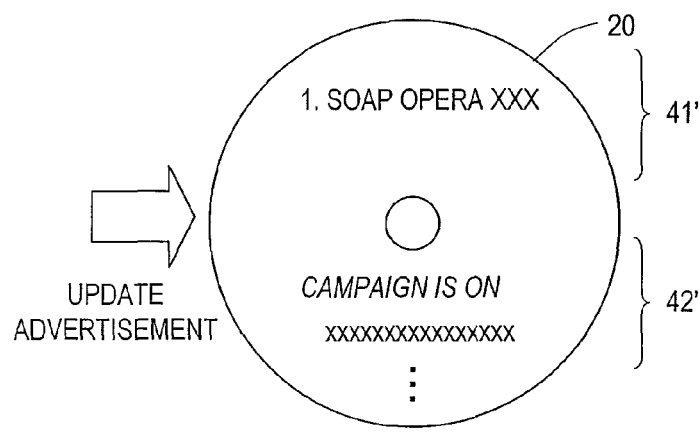
FIG.31
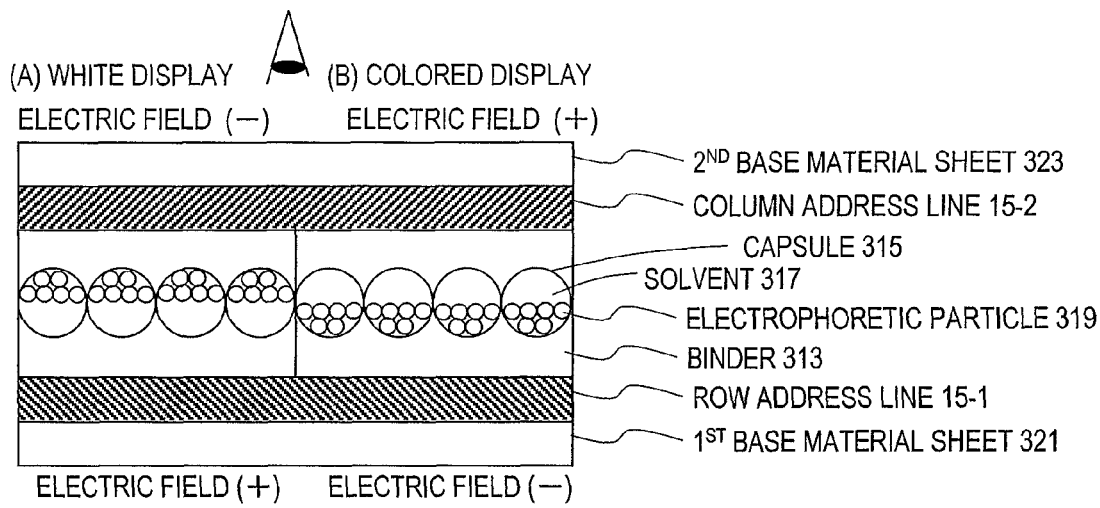

DISC DRIVE

TECHNICAL FIELD

The present invention relates to a storage medium with a sheet of electronic paper and to a data processor for displaying, on the sheet of electronic paper, information about a content that is stored on the storage medium.

BACKGROUND ART

Recently, various types of information storage media have been developed and used to store digital data thereon. Examples of those storage media include rewritable optical disks, such as DVD-RAM disks and BD-RE (Blu-ray Disc Rewritable) disks, on which data can be rewritten an unlimited number of times and write-once optical disks, such as DVD-R disks and BD-R (Blu-ray Disc Recordable) disks, on which data can be written only once but which are inexpensive instead.

Some of those optical disk have a data storage layer and a label storage layer, which is located either deeper than the data storage layer when viewed from over the light incoming side of the disk or on the opposite side (i.e., the non-light incoming side) of the disk. Label information, which is information about characters and images representing the titles of contents such as recorded programs, is stored in the label storage layer.

According to the LightScribe technology, for example, a disk, including a label storage layer (or label storage side) on the other side thereof that is opposed to its light incoming side, is used. When an optical disk drive (such as that of a DVD recorder) that is compatible with the LightScribe technology is used, the titles of recorded programs, for example, may be stored on the label storage side. Then, it is easier for the user to know what content is stored on a given disk. For example, Patent Document No. 1 discloses a technique for writing (or printing) information on the label storage side with a laser beam.

To write label information by the LightScribe technology, however, the disk needs to be turned over once and then loaded again. Also, since the label information is writable on the label side only once, the label information stored on a rewritable disk such as a DVD-RAM does not always agree with the data that is actually and currently stored on the disk, thus possibly confusing the user unintentionally. Besides, it could take as long as about 30 minutes to write label information with a laser beam as is done in the LightScribe technology.

To overcome such problems, Patent Document No. 2 discloses various storage media with a sheet of electronic paper and techniques for displaying label information using a sheet of electronic paper. Data stored on a sheet of electronic paper can be updated in just one second or less, which is much shorter than the amount of time it takes to write label information with a laser beam. What is more, there is no need to turn over the storage medium in writing information on a sheet of electronic paper. Consequently, those problems to be caused by the LightScribe technology can be resolved.

Patent Document No. 1: Japanese Patent Application Laid-Open Publication No. 2005-44502

Patent Document No. 2: Japanese Patent Application Laid-Open Publication No. 2003-331560

DISCLOSURE OF INVENTION

Problems to be Solved by the Invention

According to Patent Document No. 2, however, the drive is provided with a relatively big and complicated mechanism to transmit data to the sheet of electronic paper and display information thereon. Recently, optical disk drives need to have a further reduced thickness or size and the manufacturing costs thereof still need to be cut down. To meet such demand, it is important how to adapt such a mechanism for transmitting data from an optical disk drive to those downsizing and low cost manufacturing trends.

In addition, to make the disk drive even handier for the users, it is also necessary to control display on a sheet of electronic paper in close association with a content that is stored on a storage medium.

An object of the present invention is to provide a storage medium with a sheet of electronic paper (such as an optical disk) with a drive that can refresh the display on the sheet of electronic paper using a simple arrangement. Another object of the present invention is to provide a drive that controls the display on a sheet of electronic paper in association with a content that is stored on a storage medium.

Means for Solving the Problems

A disk drive according to the present invention includes: a motor that generates rotational force; a drive shaft support for clamping a disk thereon by contacting with the disk and for turning the disk thereon by the rotational force; and a head for reading and/or writing information from/on the disk. The drive shaft support includes at least one output terminal for outputting an electrical signal. If the disk includes electronic paper on which the display is refreshable in response to the electrical signal, the at least one output terminal is arranged so as to contact with at least one input terminal that is arranged on the disk to supply the electrical signal to the electronic paper.

The disk drive may further include a control section for controlling supply of the electrical signal to the at least one output terminal. When the disk drive is loaded with the disk, the control section may determine, based on a predetermined electrical signal, whether electrical continuity has been established or not.

The control section may change its modes of operation depending on whether the electrical continuity has been established or not.

The control section may receive image information representing the display and convert the image information into the electrical signal.

The at least one output terminal may be arranged in a circle around an axis of rotation.

The at least one output terminal may include multiple output terminals that are arranged concentrically around the axis of rotation.

A storage medium according to the present invention includes a sheet of electronic paper on which the display is refreshable. A first type of content that is viewable with a player and a second type of content that is non-viewable with the player are storable on the storage medium. And the sheet of electronic paper may display information about the content that is stored on the storage medium in a mode that changes according to the type of the content.

The sheet of electronic paper may display the information about the content stored on the storage medium in a shade that changes according to the type of the content.

The sheet of electronic paper may display the information about the second type of content such that the information includes the non-viewable status of the content.

The sheet of electronic paper may display only information about the first type of content and may not display information about the second type of content.

A data processor according to the present invention includes: a drive to be loaded with the storage medium on which a non-viewable second type of content is stored; a control section, which is electrically connected to a sheet of electronic paper of the storage medium in order to control refresh of the display on the sheet of electronic paper; a receiving section for receiving a request to get authorized to view the content from a user; and a determining section for determining whether or not to authorize the user to view the content in response to the authorization request. If the determining section has authorized the user to view it, the control section gets information about the content displayed on the sheet of electronic paper in a mode that is associated with a viewable first type of content.

The determining section may acquire billing information, indicating whether or not the content has been paid for, in response to the authorization request and may authorize him or her to view it if the content has already been paid for.

The data processor may further include a telecommunications section for communicating with the content's provider server over a network and the determining section may acquire the billing information by way of the telecommunications section.

The determining section may acquire, as the billing information, an authorization key to be distributed only to a user who has already paid for the content.

Another data processor according to the present invention includes: a drive to be loaded with a storage medium which has a data area to store content data and which includes a sheet of electronic paper on which the display is refreshable; a control section, which is electrically connected to the sheet of electronic paper of the storage medium in order to control the refresh of the display on the sheet of electronic paper; and a processing section for performing processing of writing the content data on the storage medium and generating management information, which is needed to play back the content, based on the content data. The processing section adds the content's own identification information as a piece of the management information and the control section updates the identification information as the display on the sheet of electronic paper.

The data processor may further include a receiving section for receiving the identification information being displayed on the sheet of electronic paper as a playback instruction. The processing section may read the management information and play back the content in accordance with the identification information.

A rewritable data storage medium according to the present invention includes a sheet of electronic paper, which includes a display area, a controller that refreshes the display on the display area in response to an electrical signal, and a memory in which predetermined video data has been written. On receiving an electrical signal indicating that the storage medium has been formatted, the controller reads the predetermined video data from the memory and presents the data on the display area.

Another storage medium according to the present invention includes a user data area to store user data and a non-user data area in which information about a network address is stored. The storage medium further includes a sheet of electronic paper on which the display is refreshable in response to an electrical signal.

Another data processor according to the present invention includes: a drive to be loaded with the storage medium; a control section, which is electrically connected to a sheet of electronic paper of the storage medium in order to control refresh of the display on the sheet of electronic paper; and a telecommunications section for communicating with a predetermined server over a network. In formatting the user data area of the storage medium, the drive reads information about the network address from the non-user data area of the storage medium. The telecommunications section acquires data from a server to which the network address that has been read is assigned. And the control section refreshes the display on the sheet of electronic paper based on the data that has been acquired.

Another storage medium according to the present invention includes a sheet of electronic paper on which the display is refreshable. The sheet of electronic paper includes a first display area to display information about the content that is stored on the storage medium and a second display area to display information that is not related to the content.

Information about an advertisement may be displayed in the second display area.

Information about a predetermined advertisement may be displayed in the second display area when the storage medium is shipped.

Even if the display in the first display area has been refreshed, the display in the second display area may remain the same.

The display in the second display area may be refreshed independently of the refresh of the display in the first display area.

EFFECTS OF THE INVENTION

According to the present invention, a drive shaft support for clamping a disk thereon by contacting with the disk and for transmitting the rotational force of a motor to the disk includes an output terminal for outputting an electrical signal. When the disk drive is loaded with a disk including a sheet of electronic paper, the output terminal is arranged so as to contact with an input terminal that is arranged on the disk. Since there is no need to add a movable part such as an arm with an output terminal, the manufacturing cost can be cut down. In addition, as no movable parts are used, the user can also save the cost of maintenance and the probability of failure can be reduced significantly.

Also, a data processor according to the present invention controls the display on a sheet of electronic paper in close association with the content stored on a storage medium. Thus, the user can easily know, along with the detailed information about the content, what type of content is stored on the storage medium. As a result, the storage medium can come in much handier for him or her.

BRIEF DESCRIPTION OF DRAWINGS

FIG. 6(*a*) shows the shape and location of a group of input terminals 16 on a sheet of electronic paper according to a first modified example and FIG. 6(*b*) shows the shape and location of a group of output terminals 220 according to the first modified example.

FIG. 8(a) shows the shape and location of a group of input terminals 16 on a sheet of electronic paper according to a third modified example and FIG. 8(b) shows the shape and location of a group of output terminals 220 according to the third modified example.

Figure 17:
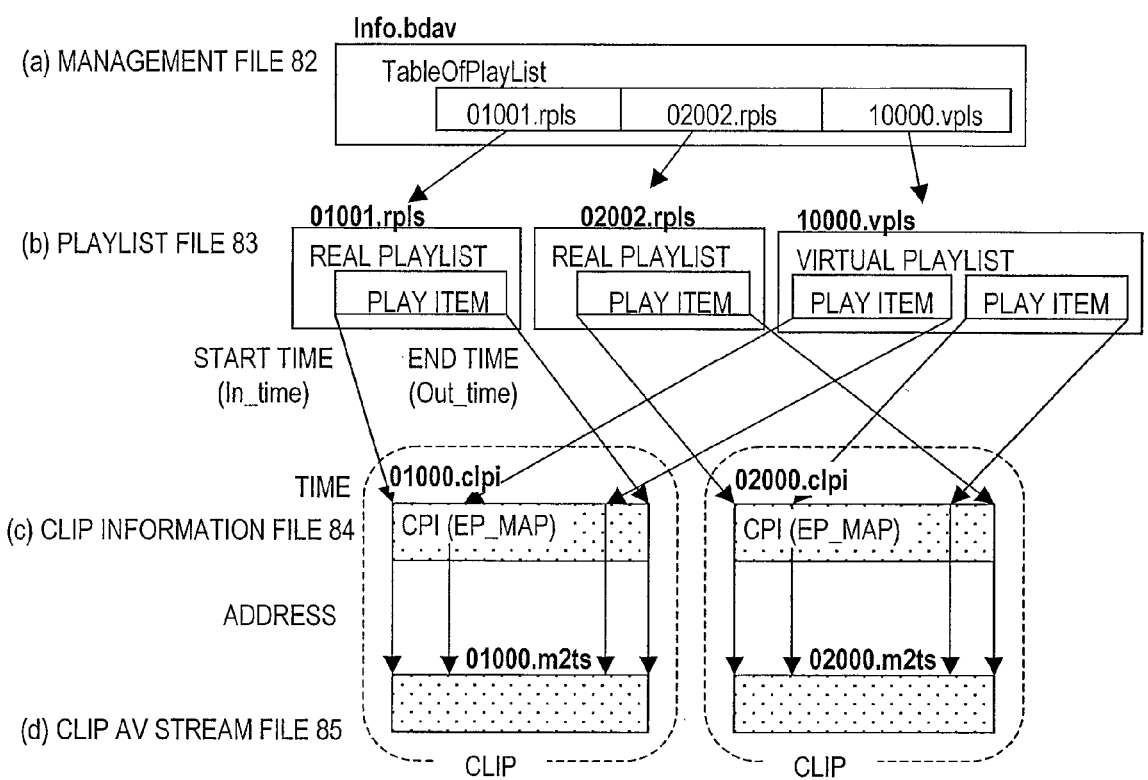

Portions (a) through (d) of FIG. 17 show a relationship between the management information and the stream data.

Figure 18:
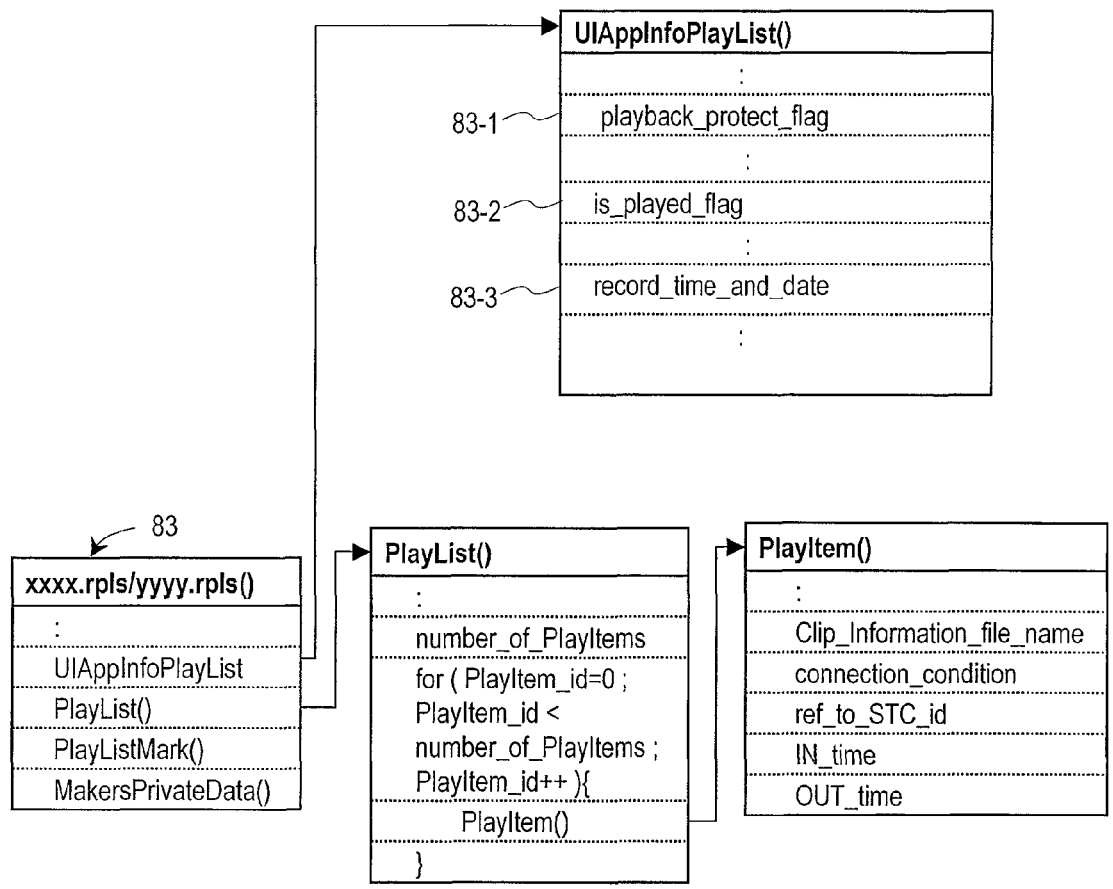

FIG. 18 shows the information (entries) stored in the playlist file 83 and its data structure.

Figure 19:
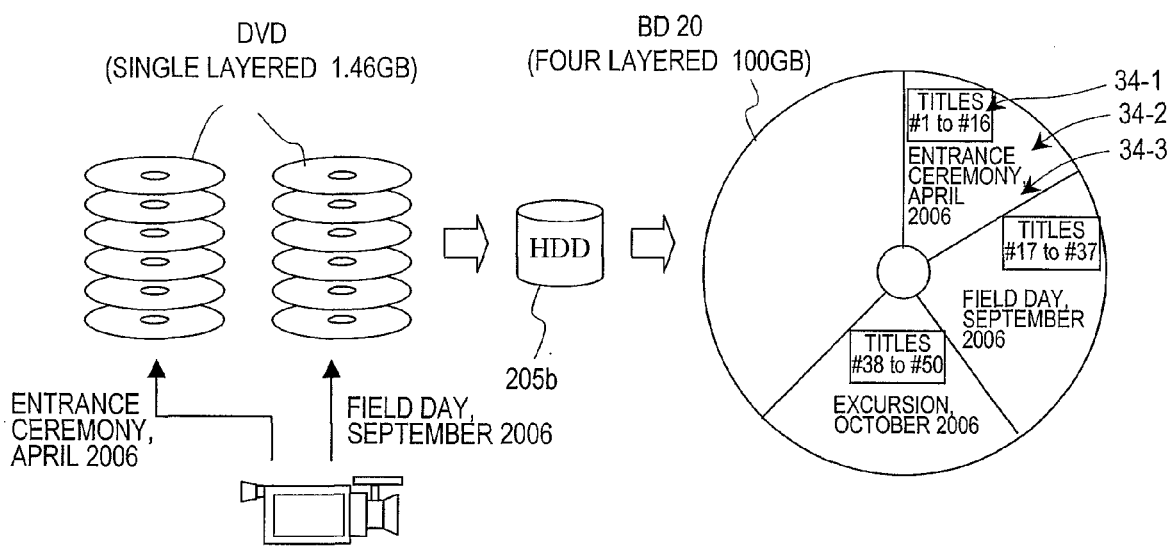

FIG. 19 shows the flow of contents and the information being displayed on a sheet of electronic paper on the BD 20 in a situation where contents that have been recorded on a number of DVDs are stored together on a single DVD 20.

Figure 20:
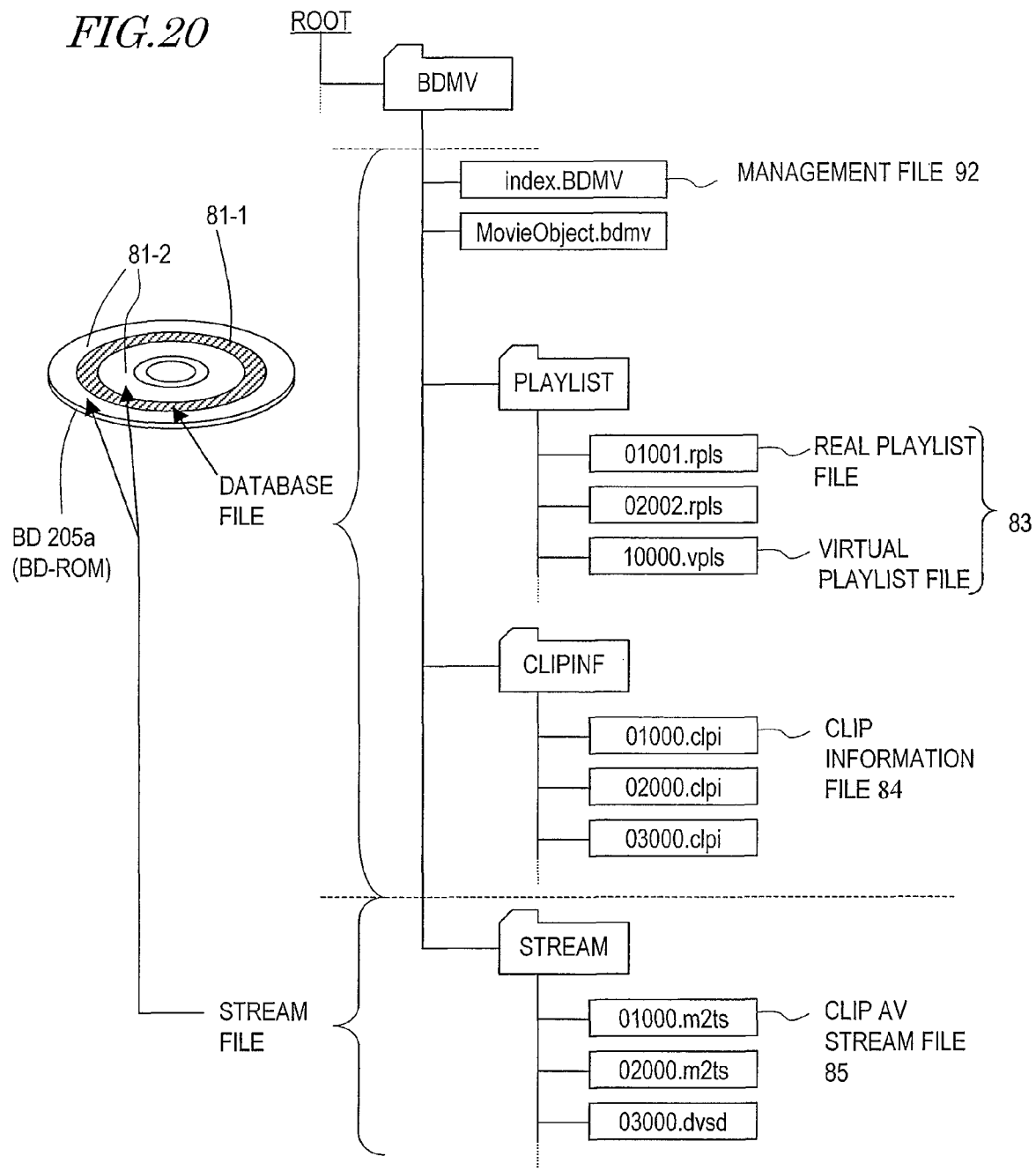

FIG. 20 shows the storage areas of a BD-ROM and its directory/file structure.

Figure 21:
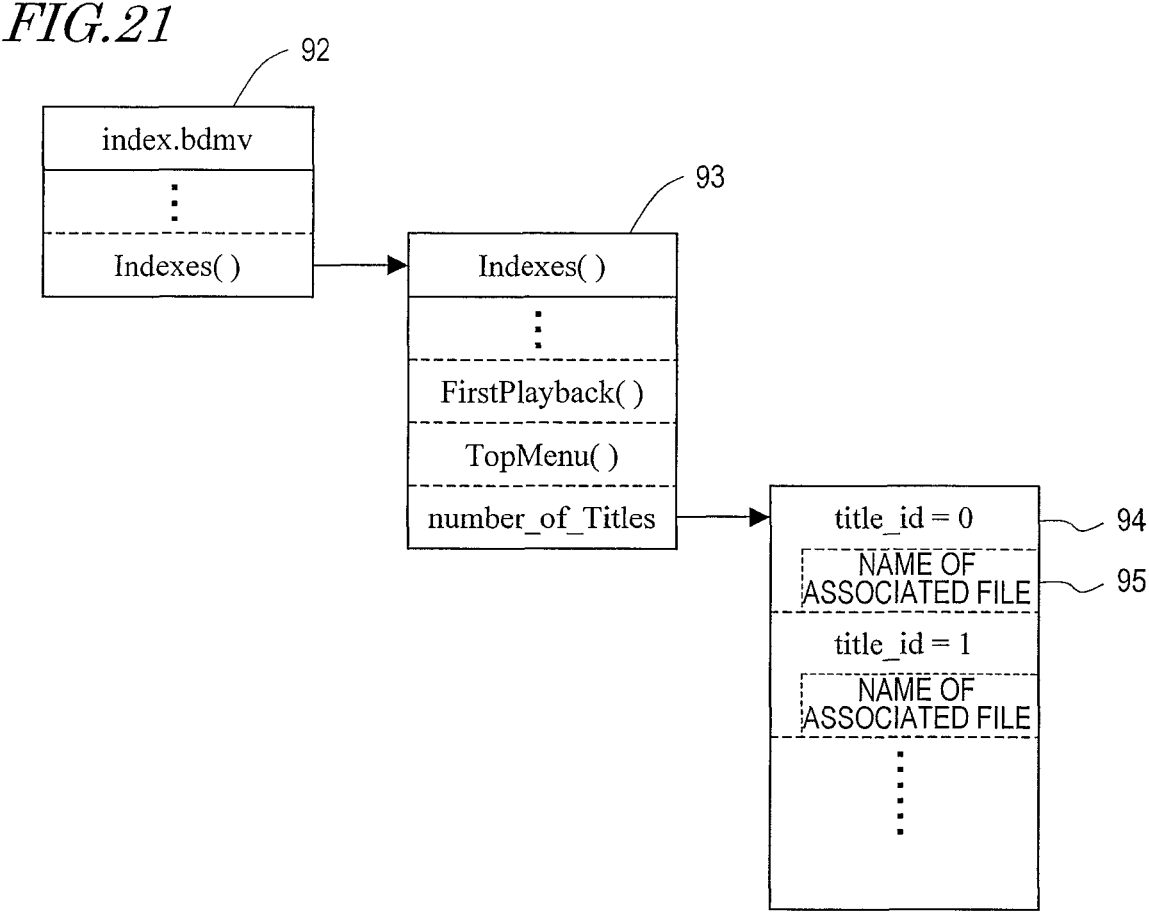

FIG. 21 shows a portion of the data structure of a management file 92.

Figure 22:
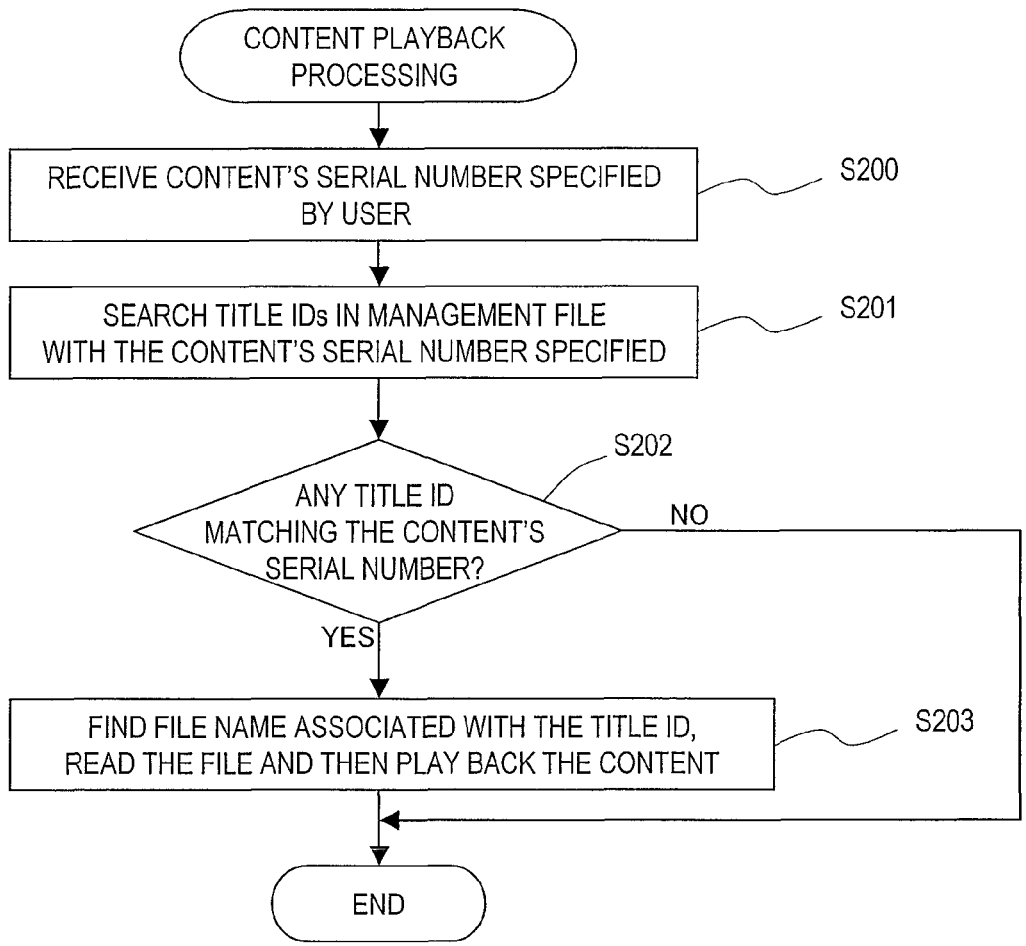

FIG. 22 is a flowchart showing the procedure of playing back a content by reference to its title ID that is displayed on a sheet of electronic paper.

Figure 23:
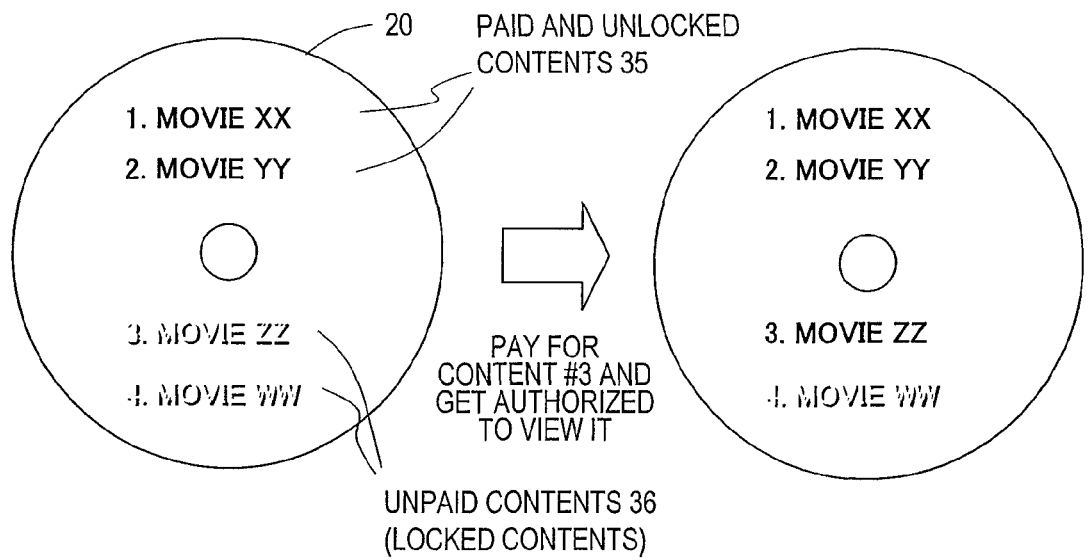

FIG. 23 shows how the information displayed on a sheet of electronic paper changes when an unpaid content is paid for.

Figure 24:
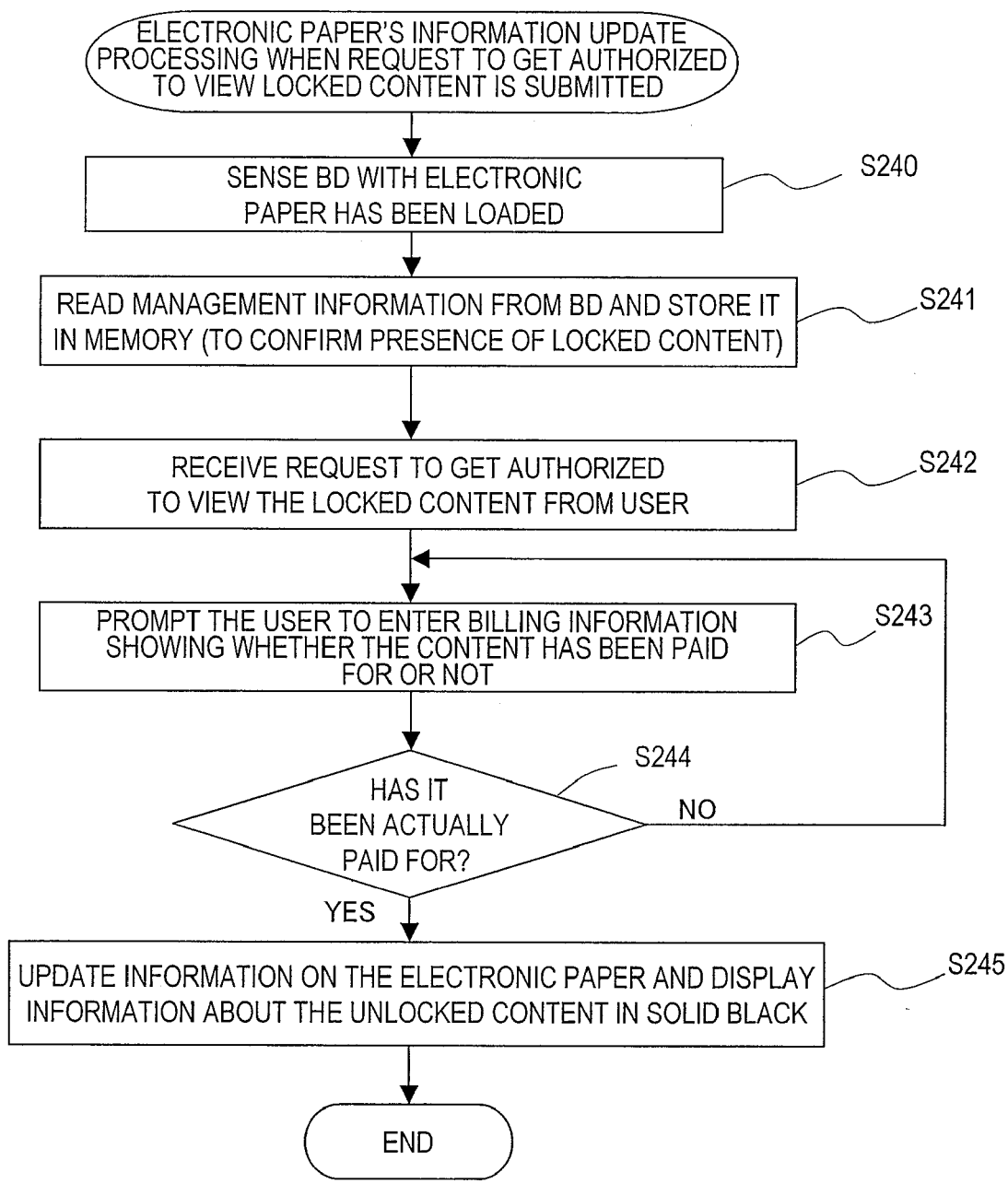

FIG. 24 is a flowchart showing the procedure of getting a locked content unlocked and updating the information displayed on a sheet of electronic paper.

FIG. 25(a) shows an example of information displayed about contents that are viewable at any time and FIGS. 25(b) through 25(d) are three examples showing how to display information 37 about a viewable content and information 38 about non-viewable contents.

Figure 26:
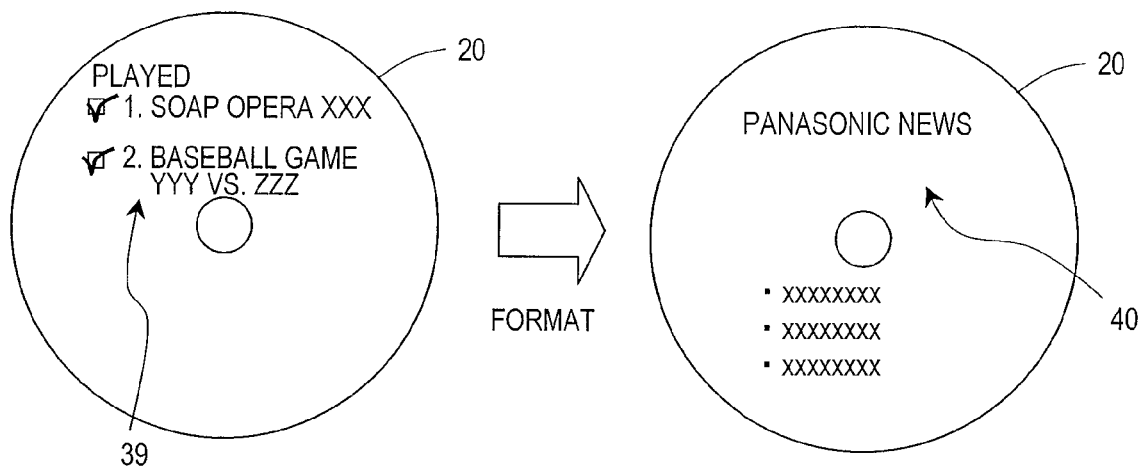

FIG. 26 shows how the information displayed on the sheet of electronic paper changes before and after the BD 20 is subjected to formatting processing.

FIG. 27(a) shows a ROM 17 that is built in a sheet of electronic paper and FIG. 27(b) shows the arrangement of a lead-in 96 on the BD 205a that forms part of the BD 20.

Figure 27:
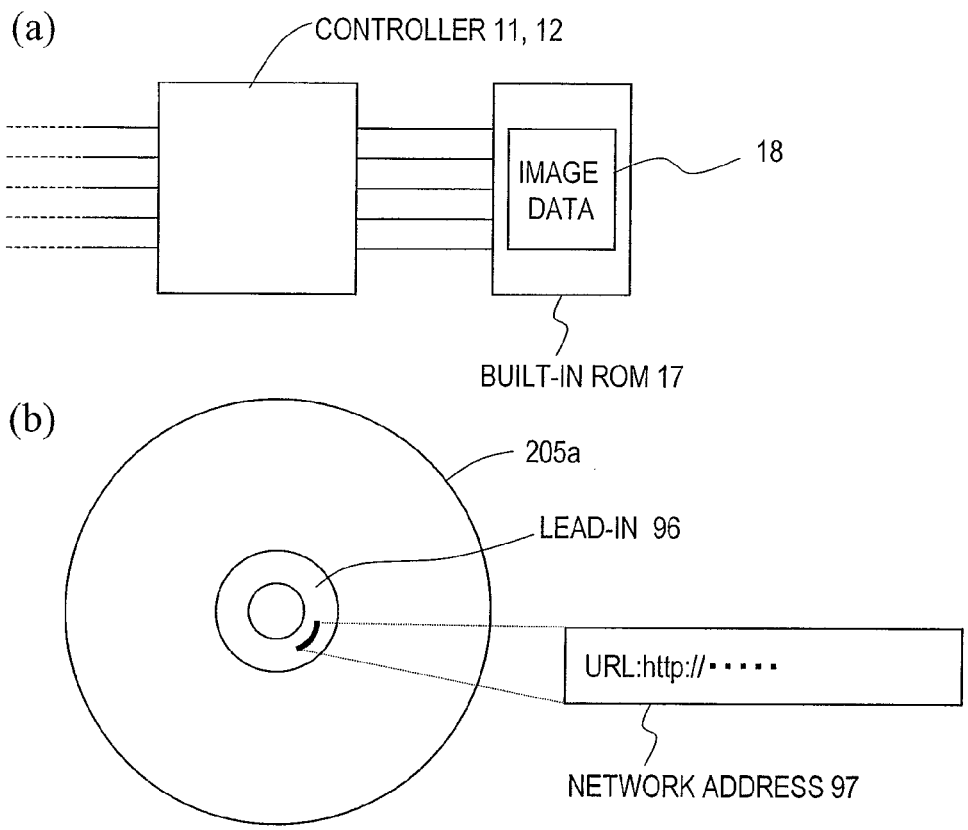
Figure 28:
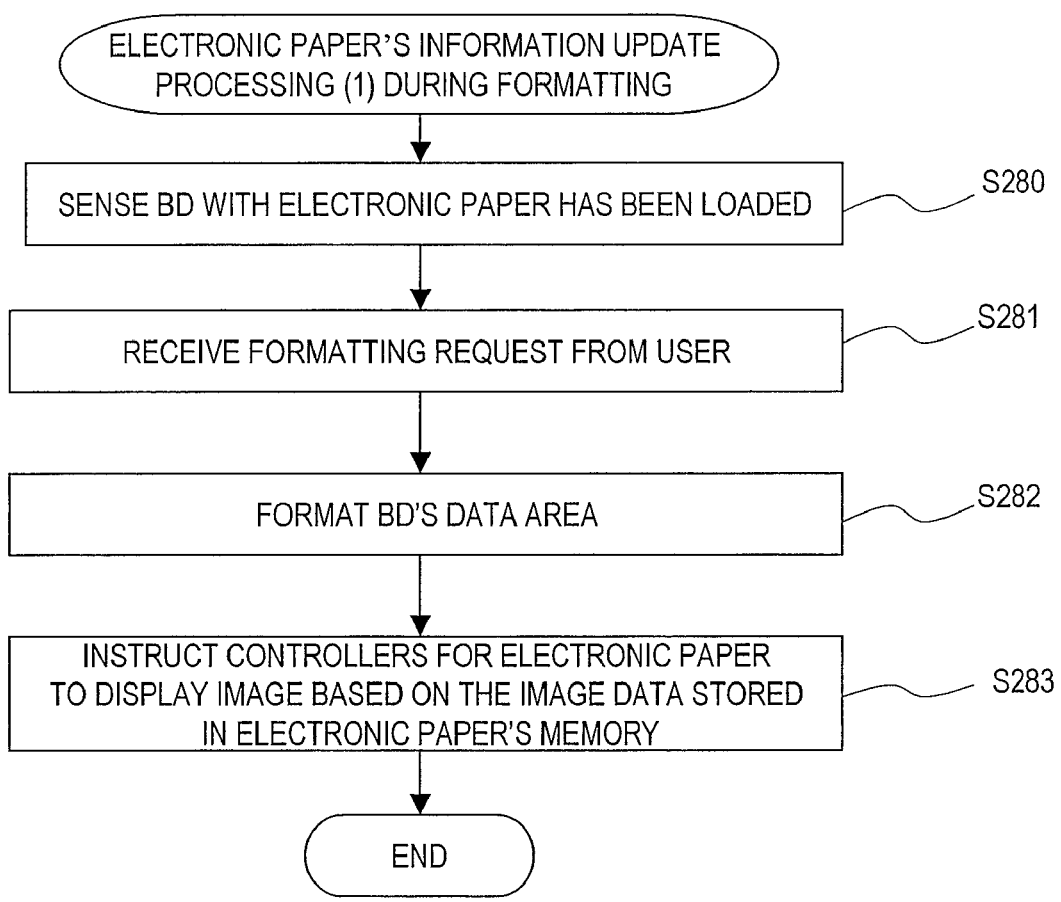

FIG. 28 is a flowchart showing the procedure of performing the electronic paper's information update processing during formatting by using the configuration shown in FIG. 27(a).

Figure 29:
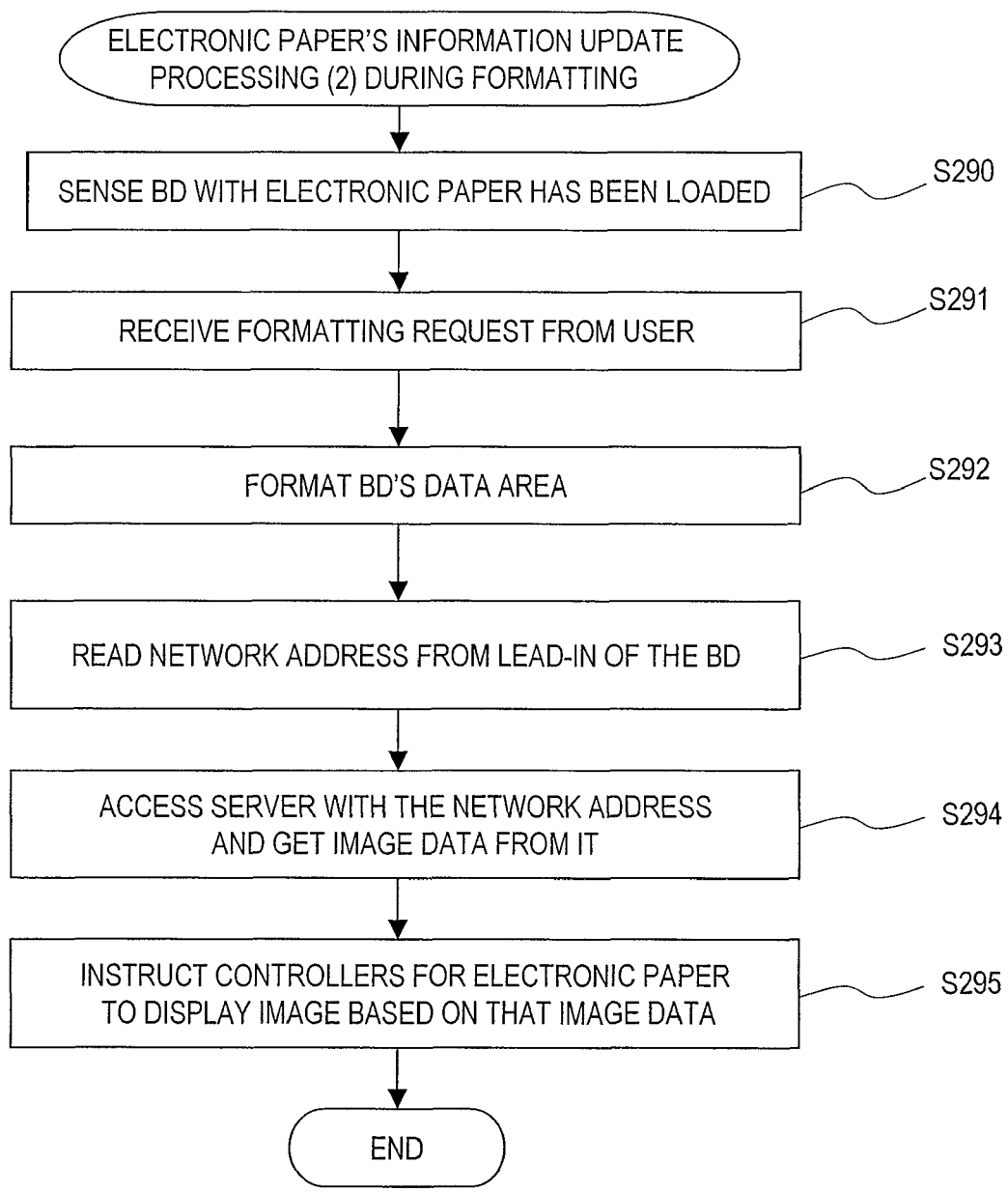

FIG. 29 is a flowchart showing the procedure of performing the electronic paper's information update processing during formatting by using the configuration shown in FIG. 27(b).

FIG. 30 shows how the information displayed on multiple display areas is updated independently of each other as the processing advances.

FIG. 31 is a cross-sectional view of a sheet of electronic paper at an intersection between a row address line and a column address line 15-2.

DESCRIPTION OF REFERENCE NUMERALS 10 electronic paper
11 row controller
12 column controller
13 display area
14 peripheral area
15-1 row address line
15-2 column address line
16 group of input terminals
20 BD with electronic paper
100 BD recorder with built-in HDD
112 memory card
205a BD
201a digital tuner
201b analog tuner
202 A/D converter
203 MPEG-2 encoder
204 TS processing section
205a BD
205b HDD
206 MPEG-2 decoder
207 graphic control section
208 memory
209 D/A converter
210 program ROM
211 CPU
212 random access memory (RAM)
213 CPU bus
214 network control section
215 instruction receiving section
216 interface (I/F) section
217 memory card control section
219 refresh control section
220 group of output terminals
221 drive shaft
222 drive shaft support
223 spindle motor
250 system control section
251 optical disk drive

BEST MODE FOR CARRYING OUT THE INVENTION

Hereinafter, preferred embodiments of a data processor according to the present invention will be described with reference to the accompanying drawings. In the following description of preferred embodiments, the data processor is supposed to be an optical disk device with a built-in HDD (more specifically, a BD recorder with a built-in HDD). Alternatively, the data processor may also be a camcorder or a laptop PC (notebook PC).

Also, in the preferred embodiments to be described below, the optical disk recorder with a built-in HDD includes drives and slots for reading and writing data from/on an optical disk, a semiconductor memory and an HDD. However, the optical disk recorder does not have to include all of these drives and slots. And all drives and slots, except the one needed to get the operations to be described below done, may be omitted.

1. Configuration of Optical Disk Device

Hereinafter, the configuration of an optical disk device according to a preferred embodiment of the present invention will be described with reference to FIG. 1, which shows an arrangement of functional blocks in a BD recorder 100 with a built-in HDD (which will be simply referred to herein as a "recorder").

The recorder 100 includes not only a BD 205a but also a hard disk in a hard disk drive (HDD) 205b as storage media. The recorder 100 can read and write arbitrary data from/on the BD 205a and the hard disk. The BD 205a may be a read-only one. In that case, the recorder 100 just reads data. In FIG. 1, the BD 205a is shown inside the recorder 100. It should be noted, however, that the BD 205a is actually removable (i.e., can be ejected) from the optical disk recorder 100 and does not form part of the recorder 100. Also, for convenience sake, reading and writing data from/on a hard disk will be stated as reading and writing data from/on the HDD 205a.

Figure 1:
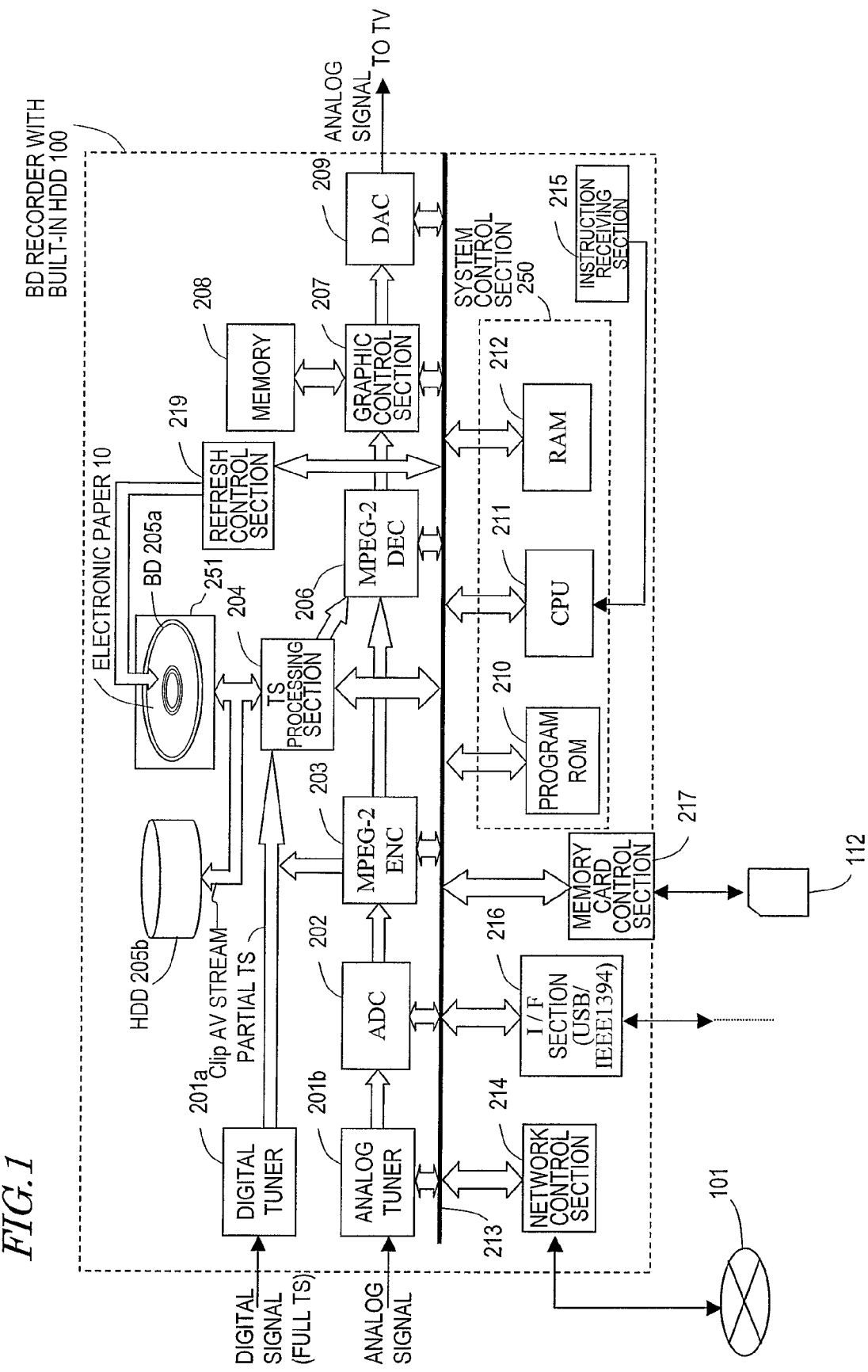
FIG. 1 shows an arrangement of functional blocks in a recorder 100 with a built-in HDD.

The BD 205a shown in FIG. 1 includes electronic paper 10, which is designed so as to refresh the display in response to an electrical signal supplied through a terminal. The recorder 100 can control the display on the electronic paper in close association with a content stored on the BD 205a. Such a display control will be described in detail later. It should be noted that the recorder 100 could also be loaded with a normal BD 205a with no electronic paper. The recorder 100 determines whether or not the electronic paper 10 is included and may change the modes of operation based on the decision result.

The recorder 100 includes a digital tuner 201a, an analog tuner 201b, an A/D converter 202, an MPEG-2 encoder 203, a TS processing section 204, an MPEG-2 decoder 206, a graphic control section 207, a memory 208, a D/A converter 209, a CPU bus 213, a network control section 214, an instruction receiving section 215, an interface (I/F) section 216, a memory card control section 217, a refresh control section 219, a system control section 250 and an optical disk drive 251.

Hereinafter, the functions of these components will be described one by one. The digital tuner 201a receives a digital signal, including at least one program (content), from an antenna (not shown). The transport stream to be transmitted as the digital signal includes packets representing a plurality of programs. Such a transport stream including packets representing a plurality of programs will be referred to herein as a "full TS". In the full TS, various pieces of attribute information about those programs are multiplexed together, thus providing a variety of services. The attribute information includes guide information, viewing control information and copy control information. The digital tuner 201a tunes itself to a particular channel, extracts only packets representing a requested program, and then outputs it as a "partial TS".

In making a partial TS from a full TS, not only those packets that store the required video and audio information but also event information table (EIT) packets, program specific information (PSI) packets and service information (SI) packets need to be extracted and corrected.

In a BS digital broadcast, guide information is defined as a short format event descriptor or an extended format event descriptor on an EIT table within an EIT packet. The guide information 91 includes various pieces of information specifying the title, cast, outline, broadcasting channel, on-air date and time, and producer of the program, for example.

In the PSI/SI packet, stored are not only program-by-program management information but also program title and other additional program information. The recorder 100 generates a single SIT packet by extracting only data required for playing back a partial TS from a PSI/SI packet of a full TS and multiplexes it in the partial TS.

The analog tuner 201b receives an analog signal from the antenna (not shown), tunes itself to a particular channel according to the frequency, extracts the signal of a requested program, and then outputs the video and audio signals of the program to the A/D converter 202.

The A/D converter 202 converts the input signals into digital ones and supplies them to the MPEG-2 encoder 203. On receiving an instruction to start recording, the MPEG-2 encoder 203 (which will be simply referred to herein as an "encoder 203") compresses and encodes the supplied digital data of the analog broadcast into the MPEG-2 format, generates a transport stream and passes it to the TS processing section 204.

In recording a content, the TS processing section 204 receives the partial TS, generates a clip AV stream from it, and records the stream on the BD 205a and/or the HDD 205b. The clip AV stream is a data stream, of which the format is suitable for recording it on the BD 205a and/or the HDD 205b. The clip AV stream is made up of a plurality of source packets, which are generated by adding a predetermined header to the respective TS packets that form the partial TS.

In playing back a content, the TS processing section 204 reads the clip AV stream from the BD 205a and/or the HDD 205b, generates a partial TS from the clip AV stream, and outputs it to the MPEG-2 decoder 206.

Also, the TS processing section 204 may receive still picture data that is stored in a memory card 112 from a memory card control section 217 to be described later and write the still picture data as it is on the BD 205a and/or the HDD 205b without processing it. Or the TS processing section 204 may also read the still picture data that has been written on the BD 205a and/or the HDD 205b and output it to the decoder 206.

In this description, the TS processing section 204 is supposed to write data on the BD 205a and/or the HDD 205b and read data from at least one of them just for illustrative purposes. However, the stream is actually written on, or read from, the BD 205a or HDD 205b by respective drives and their controllers (not shown) as the disk rotates and as the head moves.

The MPEG-2 decoder 206 (which will be simply referred to herein as a "decoder 206") analyzes the partial TS supplied to get MPEG-2 compression-encoded data. Then, the decoder 206 expands the compression-encoded data, converts it into decompressed data and then passes it to the graphic control section 207. The decoder 206 can convert not only the MPEG-2 compression encoded data but also still picture data compliant with the JPEG standard into decompressed data. The graphic control section 207 is connected to the internal computer memory 208 and realizes an on-screen display (OSD) function. For example, the graphic control section 207 combines any of various menu pictures with the video and outputs the resultant synthetic image to the D/A converter 209. In response, the D/A converter 209 converts the input OSD synthetic image and audio data into analog data and outputs them to the TV 106, for example.

The CPU bus 213 is a path for transferring signals in the recorder 100 and is connected to the respective functional blocks as shown in FIG. 1. In addition, the respective components of the system control section 250 to be described later are also connected to the CPU bus 213.

The network control section 214 is an interface for connecting the recorder 100 to the network 101 such as the Internet and is a terminal and a controller that are compliant with the Ethernet™ standard, for example. The network control section 214 exchanges data over the network 101. The data may be an authorization request for a content provider when the user is going to view a content that he or she paid for, billing information provided by the content provider to indicate whether or not the content has been paid for, or updated data of a software program for controlling the operation of the recorder 100.

The instruction receiving section 215 is either an operating button arranged on the body of the recorder 100 or a photodetector section for receiving an infrared ray from a remote controller. The instruction receiving section 215 receives a user's instruction to start or stop a recording operation or to start or stop playing back a recorded program or the authorization request just mentioned.

The interface (I/F) section 216 controls the connector for use to allow the recorder 100 to communicate with other devices and also controls the communications themselves. The I/F section 216 includes a terminal compliant with the USB 2.0 standard, a terminal compliant with the IEEE standard, and a controller for enabling data communications according to any of these various standards and can exchange data according to a method that complies with any of these standards. For example, the recorder 100 may be connected to the PC 108 or a camcorder (not shown) by way of the USB 2.0 terminal and to a digital high-definition TV tuner or the camcorder (not shown) by way of the IEEE 1394 terminal, respectively.

The memory card control section 217 includes a slot for loading the memory card 112 into the recorder 100 and a controller for controlling data communications between the recorder 100 and the memory card 112.

The system control section 250 controls the overall processing of the recorder 100 including the signal flows there and includes a program ROM 210, a CPU 211 and a random access memory (RAM) 212, all of which are connected to the CPU bus 213. A software program for controlling the recorder 100 is stored in the program ROM 210. The various flowcharts included in the accompanying drawings are installed as respective software programs.

The CPU 211 is a central processing unit for controlling the overall operation of the recorder 100. By reading and executing a program, the CPU 211 generates a control signal to realize the processing defined by the program and outputs the control signal to the respective components over the CPU bus 213. Also, the CPU 211 generates management information that is needed to play back a content and output the information to the TS processing section 204 and memory card control section 217 over the CPU bus.

The RAM 212 has a work area for storing data that is needed for the CPU 211 to execute the program. For example, the CPU 211 reads out a program from the program ROM 210 and outputs it to the RAM 212 through the CPU bus 213 and executes the program. The computer program may be circulated on the market by being stored on a storage medium such as a CD-ROM or downloaded over telecommunications lines such as the Internet. As a result, a computer system that is set up using a PC and so on can also operate as a data processor having functions that are equivalent to those of the recorder 100 of this preferred embodiment.

The optical disk drive 251 reads and writes data from/on the BD 205a, and may include a disk tray, an optical head, a spindle motor, a rotating shaft to transmit the rotational force of the spindle motor to the disk, and a controller for controlling the overall operation of the drive (not of which are shown). Some of these components will be described later with reference to FIG. 5(b) and other drawings.

The refresh control section 219 receives information about the object to be displayed (i.e., image data) and converts it into an electrical signal. Then, the refresh control section 219 transmits the electrical signal to a sheet of electronic paper 10 by way of an output terminal provided for the optical disk drive 251, thereby controlling the refresh of the display on the sheet of electronic paper 10. It will be described later exactly how the refresh is done by the refresh control section 219.

2. Structure of BD with Electronic Paper

Figure 2:
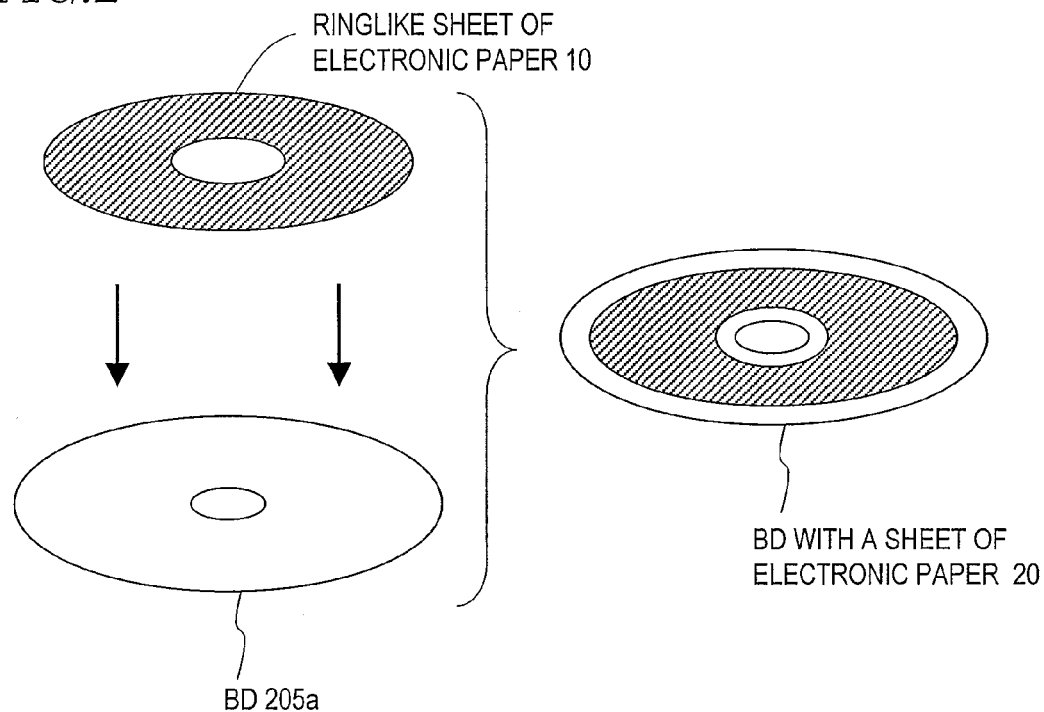
FIG. 2 illustrates the structure of a BD 20 with a sheet of electronic paper.

FIG. 2 illustrates the structure of a BD 20 with a sheet of electronic paper, which is formed by bonding a ringlike sheet of electronic paper 10 to one side of the BD 205a with an adhesive, for example. In the following description, the BD 205a with the sheet of electronic paper 10 will be referred to herein as a BD 20. It should be noted that the BD 205a could be either a recordable disk such a BD-RE disk or a BD-R disk or a read-only disk such as a BD-ROM.

Figure 3:
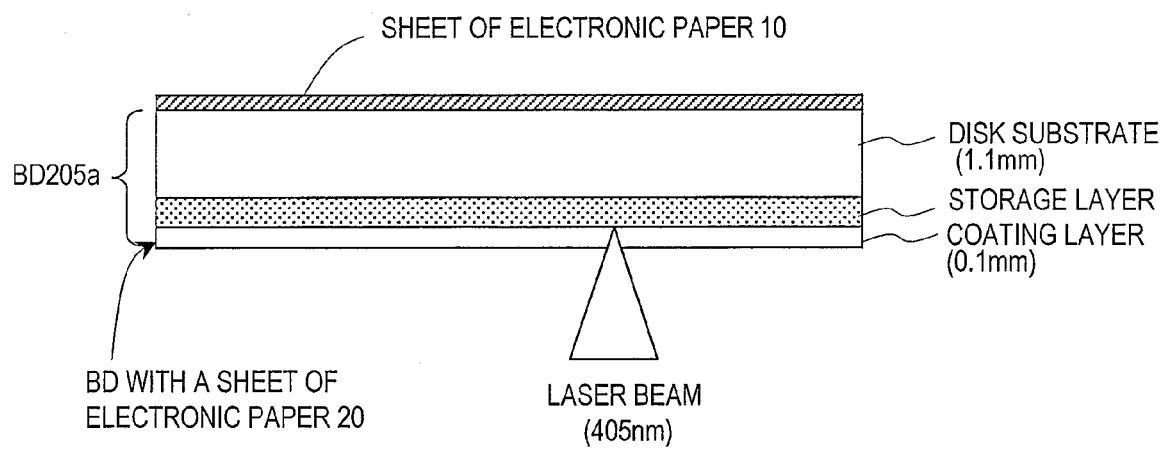
FIG. 3 illustrates a cross section of the BD 20.

FIG. 3 illustrates a cross section of the BD 20. In the BD 20, a coating layer, a storage layer and a disk substrate are stacked in this order on one side of the BD 20 to be irradiated with a laser beam with a wavelength of approximately 405 nm, and the sheet of electronic paper 10 is bonded onto the disk substrate. In the following description, one side of the BD 20, to which the sheet of electronic paper 10 is bonded, will be referred to herein as the "upside", while the other side of the BD 20 with no sheet of electronic paper 10 (i.e., the coating layer side) will be referred to herein as the "downside". The downside of the BD 20 is irradiated with a laser beam to read and/or write data from/on that side.

Hereinafter, the sheet of electronic paper 10 will be described in detail. First of all, most important features of the sheet of electronic paper 10 are that the display on the sheet is refreshable in a sufficiently short response time (e.g., one second or less) and that even if the application of an external electric field is stopped after the display has been refreshed, the same information can still be displayed. That is why even after the BD 20 has been removed from the recorder 100, the user can still check the information being displayed on the sheet of electronic paper 10 on the BD 20.

By taking advantage of such features, some information may be displayed on the sheet of electronic paper 10 when the BD 20 is shipped. For example, if an advertisement were displayed on a blank BD 20, the retail price of the BD 20 could be lowered.

The electronic paper 10 performs a display operation on any of various principles that have been developed so far. Among other things, a charged bead method by Gyricon Media Inc. that uses gyricon beads and an electrophoresis method by E Ink Corporation that uses microcapsules are particularly well known as mentioned in Japanese Patent Application Laid-Open Publication No. 2004-244620.

The charged bead method is a display method that uses solid particles with black and white hemispheres (which are called "gyricon beads") and rotates those particles with charge on a driver layer. That is to say, white is displayed when the white hemisphere is shown and black is displayed when the black hemisphere is shown.

On the other hand, the electrophoresis method is a display method that uses an electrophoresis phenomenon. Specifically, according to the electrophoresis method, blue liquid and white charged particles (such as titanium oxide particles) are put into microcapsules of a transparent resin, and those white charged particles, dispersed in the liquid, move within the microcapsules in response to an external electric field applied. By controlling how to apply the external electric field, the white charged particles may be attracted toward the surface of the electronic paper. Then, white is displayed on the electronic paper. However, if the white charged particles are attracted toward the back surface of the electronic paper, blue is displayed on the electronic paper. Optionally, black may also be displayed by providing a filter.

In the following description, the electronic paper is supposed to work by the electrophoresis method that uses microcapsules. By using the sheet of electronic paper 10, characters, graphics and various other patterns can be displayed thereon. Optionally, if color filters are used, those patterns may also be displayed in colors on the sheet of electronic paper 10.

Figure 4:
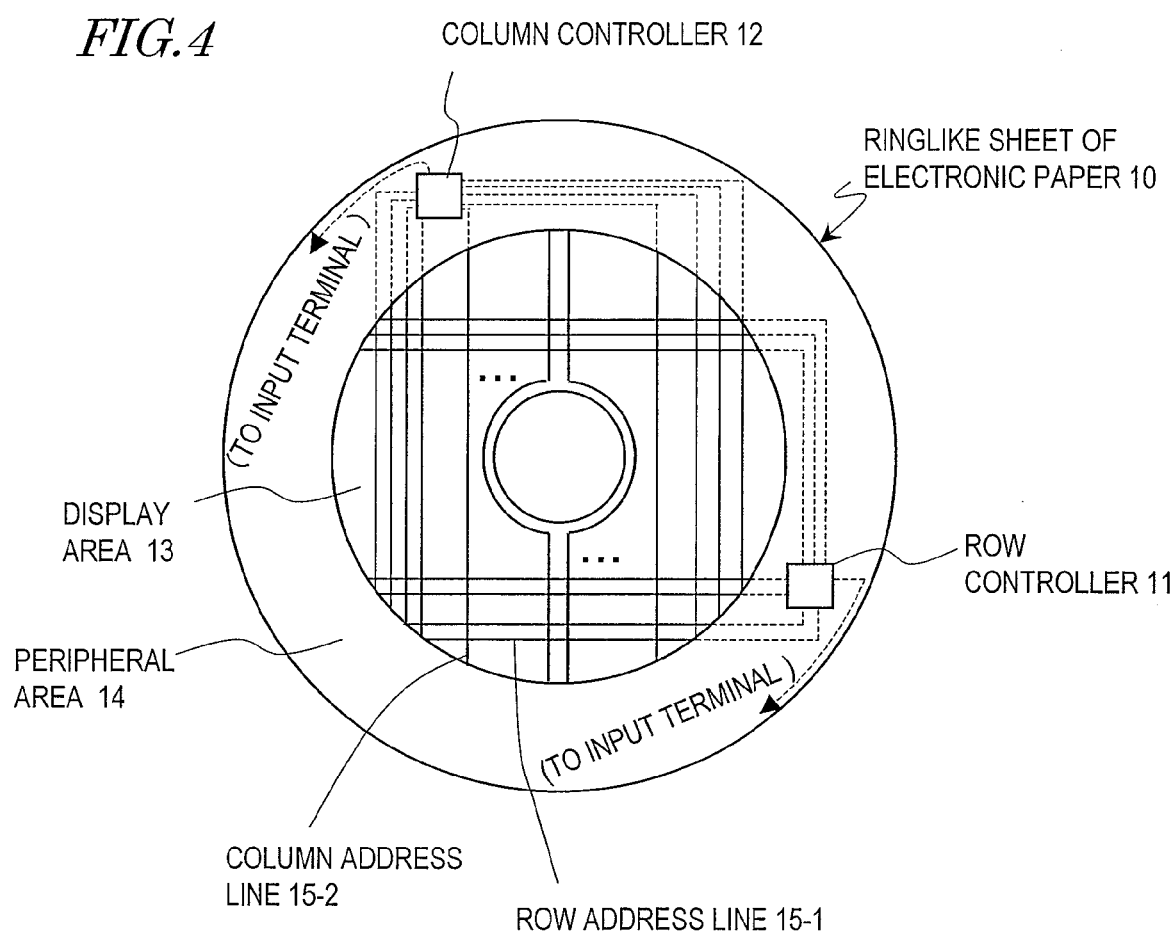
FIG. 4 shows the wiring pattern of a ringlike sheet of electronic paper 10.

FIG. 4 shows the wiring pattern of the ring-like sheet of electronic paper 10, which consists essentially of a display area 13 and a peripheral area 14. The display area 13 is an area to display characters, graphics and so on. In the display area 13, row address lines 15-1 and column address lines 15-2 are arranged in columns and rows so as to apply an external electric field to the particles. At the center of the display area 13, there is a hole corresponding to the circular center holes of the BD 205a. And the row and column address lines are arranged so as to extend around the hole.

In the peripheral area 14, arranged are a row controller 11 and a column controller 12, which control the voltages to be applied to the row address lines 15-1 and the column address lines 15-2, respectively. The voltages to be applied are determined based on the electrical signal supplied through the input terminal (to be described later) of the ringlike sheet of electronic paper 10. The electrical signal represents the image data to be displayed.

Portions (A) and (B) of FIG. 31 show a cross section of the sheet of electronic paper 10 at an intersection between a row address line 15-1 and a column address line 15-2.

The sheet of electronic paper 10 includes a first base material sheet 321 including the row address line 15-1, an electrophoresis layer, and a second base material sheet 323 including the column address line 15-2. The electrophoresis layer is sandwiched between the row and column address lines 15-1 and 15-2. The user can see the pattern being displayed on the electronic paper from over the second base material sheet 323, for example.

The first base material sheet 321 may be made of paper or a synthetic resin, which may be either transparent or colored. The synthetic resin may be colored by compounding a coloring pigment with the resin or forming color ink layer(s) on at least one side of the first base material sheet 321 by a known printing or coating process. Any color shade may be selected appropriately as long as the pattern is easy to read or recognize.

The second base material sheet 323 may be made of a transparent synthetic resin. Into the synthetic resin, a slip additive, an antistatic agent, an antibacterial agent, a dispersant or a pigment may be added unless the reversible display is affected and as long as the pattern is easily readable or recognizable.

The row and column address lines 15-1 and 15-2 may be formed on the first and second base material sheets 321 and 323, respectively, by depositing a film of aluminum, ITO or any other suitable material on the surface of the first and second base material sheets 321 and 323 made of polyester, for example, and then patterning the material into the shapes of those address lines by an etching process. The column address lines 15-2 may be made of transparent ITO, but the row address lines 15-1 on the base material sheet 321 may be made of a non-transparent conductive material such as aluminum, copper or gold.

The E Ink electrophoresis layer produced by E Ink Corporation is a binder 313 including a huge number of capsules 315 and has been formed in the shape of a sheet. The capsules 315 are filled with a solvent 317 in which very small electrophoretic particles 319 are dispersed movably.

The capsules 315 are made of formaldehyde cross-linked urea resin and have a diameter of about 40 μm. The solvent 317 in the capsules is an insulating liquid such as Isopar G, may include a dissolved dye, and has its specific gravity equalized by tetrachloroethylene with that of the electrophoretic particles 319. Since the solvent 317 and the electrophoretic particles 319 have the same specific gravity, the electrophoretic particles 319 stay at the same position even when the BD 20 is rotated at high velocities. That is why the information displayed is never affected. The electrophoretic particles 319 may be fine particles of titanium oxide, which have a particle size of 0.2 μm to 0.3 μm and which are coated with low-density polyethylene.

The electrophoretic particles 319 are attracted toward the negative part of the electric field, which corresponds to either the row address lines 15-1 or the column address lines 15-2 that are supplied with the lower voltage.

Portion (A) on the left-hand side of FIG. 31 shows an example in which the column address lines 15-2 represent the negative part of the electric field. In that case, the electrophoretic particles 319 are attracted toward the column address lines 15-2 and white is displayed in the display area. On the other hand, portion (B) on the right-hand side of FIG. 31 shows an example in which the row address lines 15-1 represent the negative part of the electric field. In that case, the electrophoretic particles 319 are attracted toward the row address lines 15-1 and either black or the color of the solvent is displayed in the display area.

Of the information (i.e., image data) displayed on the sheet of electronic paper 10, data in the row and column directions are sequentially supplied to the row address lines 15-1 and the column address lines 15-2 synchronously with each other.

Optionally, a switching element such as a transistor may be provided at each intersection between the row and column address lines 15-1 and 15-2. Such electronic paper with transistors is disclosed in Japanese Patent Application Laid-Open Publication No. 2002-169190.

In the example described above, the microcapsules are supposed to be filled with a blue liquid and white charged particles. However, a different combination may be adopted as well. For example, microcapsules of a transparent resin may be filled with a transparent insulating liquid (or fluid), positive charged white particles and a negative charged black pigment. By controlling the moving directions of the white particles and the black pigment with a potential difference created between the row and column address lines 15-1 and 15-2, black and white can be displayed on the sheet of electronic paper.

Other types of electronic paper that adopt a method of display other than the electrophoresis are also under development. Examples of those alternative types of electronic paper include optical write type electronic paper and QR-LPD electronic paper. The present invention may be carried out by adopting any of these types of electronic paper as well.

FIG. 5(a) shows the shape and location of a group of input terminals 16 for a sheet of electronic paper on the BD 20. The group of input terminals 16 is arranged in an inside part of the data area, which is supposed to be irradiated with a laser beam, on the back surface of the BD 20. The respective input terminals are arced, arranged at mutually different radial locations and connected to the row controller 11 and the column controller 12.

FIG. 5(b) shows the shape and location of a group of output terminals 220 on the optical disk drive 251. When contacting with the group of input terminals 16 on the back surface of the electronic paper, the group of output terminals 220 are electrically connected to the input terminals 16 and transmit an electrical signal, supplied from the refresh control section 219, to the group of input terminals 16. The respective output terminals 220 are arranged concentrically with respect to the drive shaft 221 of the optical disk drive 251. Once the radial locations of the group of input terminals 16 have been determined, the group of output terminals 220 can be arranged so as to contact with the group of input terminals 16. The rotational force, generated by the spindle motor 223, is transmitted to the drive shaft 221. Those output terminals 220 turn along with the drive shaft 221.

Such configuration and arrangement of this group of output terminals 220 are advantageous as being easily applicable to even an optical disk drive of a small size. For example, a thin optical disk drive adopted in laptop PCs often fixes a BD 20 by fitting it onto the drive shaft 221. Therefore, if the group of output terminals 220 are arranged concentrically, the group of output terminals 220 can be brought into contact with the group of input terminals 220 just as intended, no matter where the BD 20 has been fitted.

The shapes and arrangements of the group of input terminals 16 and the group of output terminals 220 may be modified in various manners. An optical disk drive with a drive shaft support, for example, preferably has the configuration shown in FIG. 6.

FIG. 6(a) shows the shape and location of the group of input terminals 16 on the sheet of electronic paper according to a first modified example. The group of input terminals 16 are arranged in a ringlike and concentric pattern on the upside of the BD 20. FIG. 6(b) shows the shape and location of the group of output terminals 220 according to the first modified example. Some optical disk drives have a drive shaft support 222 for its drive shaft 221. That is why ringlike output terminals, arranged at mutually different radial locations, may be provided for the drive shaft support 222.

Figure 5:
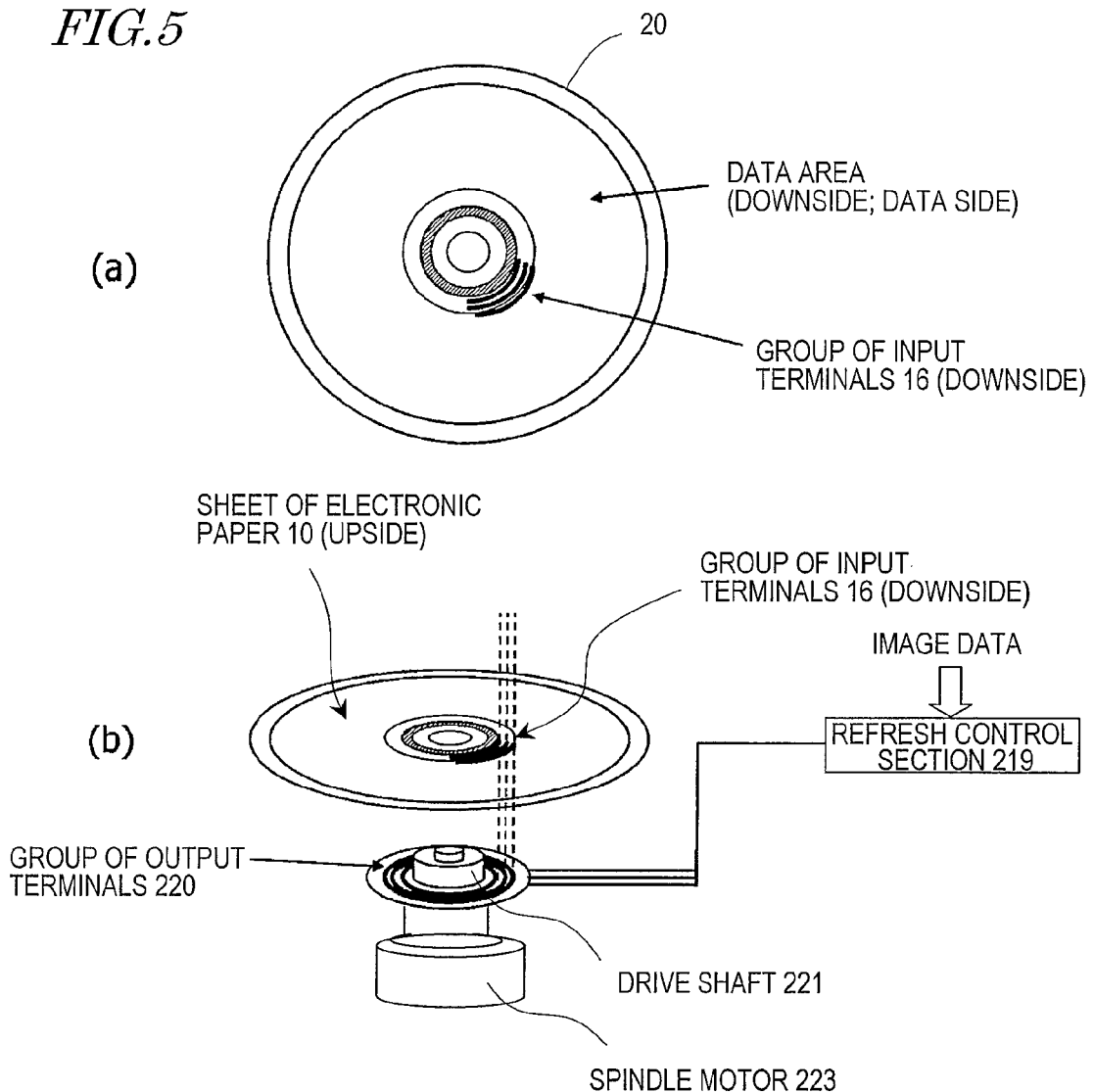
FIG. 5(*a*) shows the shape and location of a group of input terminals 16 for a sheet of electronic paper on the BD 20 and FIG. 5(*b*) shows the shape and location of a group of output terminals 220 on an optical disk drive 251.

In the examples shown in FIGS. 5 and 6, not only when the BD 20 is in rest position but also while the BD 20 is rotating, the group of input terminals 16 and the group of output terminals 220 contact with each other. This means that the electrical signal can be supplied with stability, no matter whether the BD 20 is rotating or not. That is why the display on the sheet of electronic paper 10 can be refreshed at any time.

In addition, in the examples shown in FIGS. 5 and 6, the terminals are arranged concentrically on the inside part of the BD 205a, and therefore, can be arranged in a small ringlike pattern (i.e., can have a short wire length). As a result, the supplier of the disks can manufacture BDs 20 at a reduced cost, and the manufacturer of the optical disk drive 251 only needs to arrange the group of output terminals 220 and their wiring. Consequently, the optical disk drive 251 can be manufactured more easily and at a reduced cost. Among other things, as there is no need to provide an arm or any other additional movable part as required in the prior art, the manufacturing cost can be cut down. Furthermore, since no movable parts are used, the user can also save the cost of maintenance and the probability of failure can be reduced significantly.

In FIGS. 5 and 6, each of the group of input terminals 16 and the group of output terminals 220 includes three terminals, which are associated with a power line, the row address lines 15-1 and the column address lines 15-2, respectively. However, each of these groups may include at least two terminals. This is because as long as there are a voltage line for driving the controllers 11 and 12 for the sheet of electronic paper 10 and a signal line for transmitting an electrical signal (as a control signal) that represents the information displayed on the sheet of electronic paper 10, the refresh control of the display can be performed. The greater the number of terminals, the broader the data bus width and the higher the data transfer rate would be. But the higher the transfer rate, the more expensive it is to make such a circuit. That is to say, tradeoff is inevitable between the transfer rate and the cost, and therefore, the arrangement may be modified appropriately according to the design.

Optionally, the sheet of electronic paper 10 may be provided with an RF receiver (not shown). In that case, the RF receiver may be designed so as to receive data representing the information to be displayed wirelessly from the refresh control section 219 and supply an electrical signal representing the data to the controllers 11 and 12. In that case, only one voltage line needs to be provided to drive each circuit.

Figure 7:
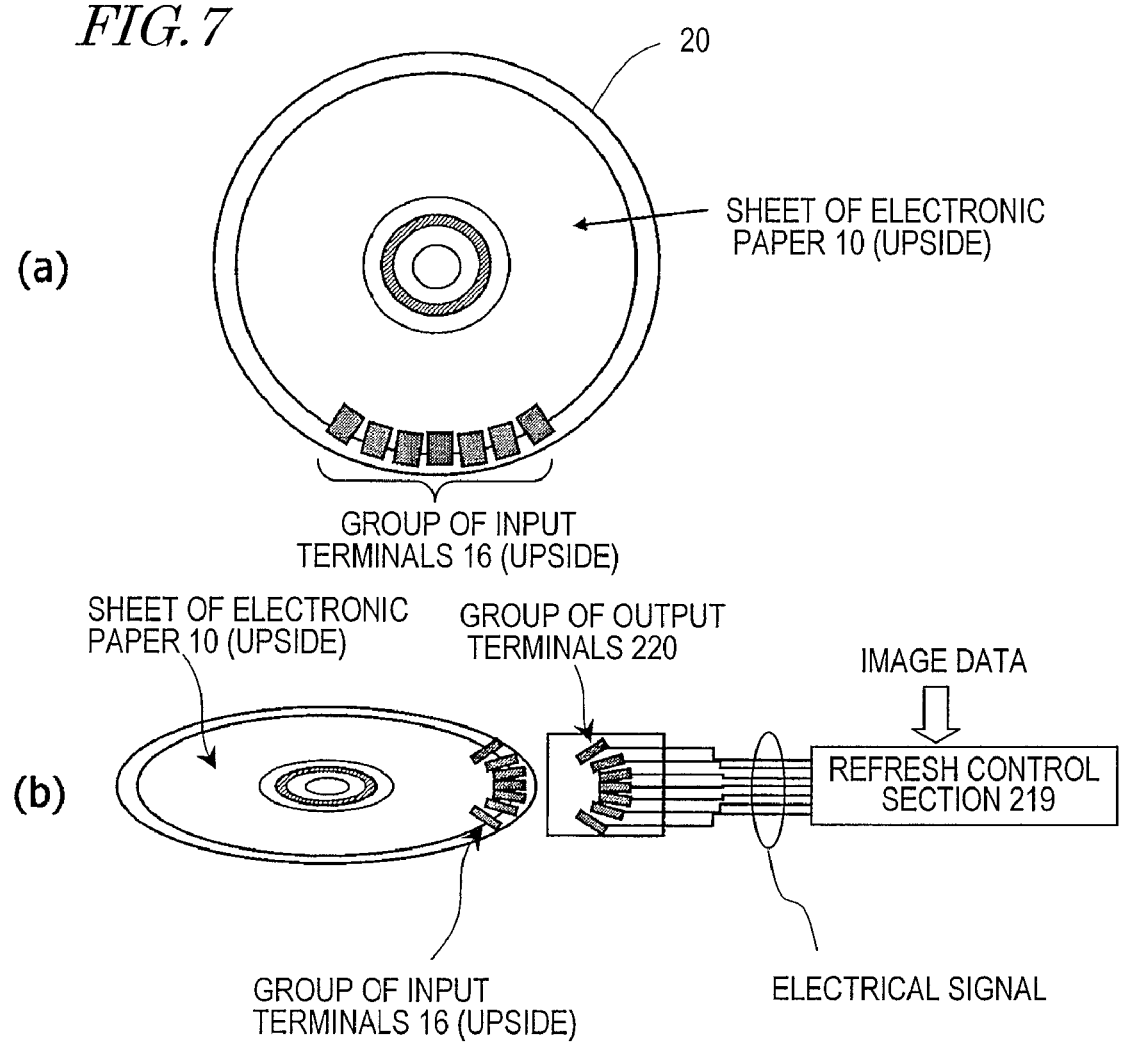
FIG. 7(a) shows the shape and location of a group of input terminals 16 on a sheet of electronic paper according to a second modified example and FIG. 7(b) shows the shape and location of a group of output terminals 220 according to the second modified example.

FIGS. 7 and 8 show another modified example of the group of input terminals 16 and group of output terminals 220 that are associated with each other.

FIG. 7(a) shows the shape and location of the group of input terminals 16 on the sheet of electronic paper according to a second modified example. The group of input terminals 16 are densely arranged in a peripheral area 14 of the sheet of electronic paper 10 on the upside of the BD 20. FIG. 7(b) shows the shape and location of the group of output terminals 220 according to this second modified example.

In the example shown in FIG. 7, while the disk is in rest position, the electrical signal is transmitted to the sheet of electronic paper 10. The optical disk drive 251 performs a drive control so as to bring the group of output terminals 220 into contact with the group of input terminals 16 on the BD 205a. For example, the optical disk drive 251 may position the terminals with respect to each other by recognizing a predetermined image pattern on the label side or the shape of the voltage terminals and then bring the terminals into contact with each other.

FIG. 8(a) shows the shape and locations of the groups of input terminals 16 on the sheet of electronic paper according to a third modified example. The groups of input terminals 16 are dispersed on the outer periphery of the sheet of electronic paper 10 on the upside of the BD 20. FIG. 8(b) shows the shape and location of the group of output terminals 220 according to the third modified example.

In the example shown in FIG. 8, the electrical signal is transmitted to the sheet of electronic paper 10 while the disk is rotating. The group of output terminals 220 laterally contacts with the BD 20 rotating. To compensate for the offset of the center of rotation of the disk, the group of output terminals 220 may be either movable or fixed with a spring, for example.

It should be noted that this example is also applicable to a disk that is not rotating. For example, if the group of output terminals 220 is arranged on the disk tray, the user just needs to put the disk on the tray such that the group of input terminals 16 and the group of output terminals 220 contact with each other.

In the examples described above, the electronic paper 10 is supposed to be a ringlike sheet. However, the electronic paper 10 may have any other shape.

Figure 9:
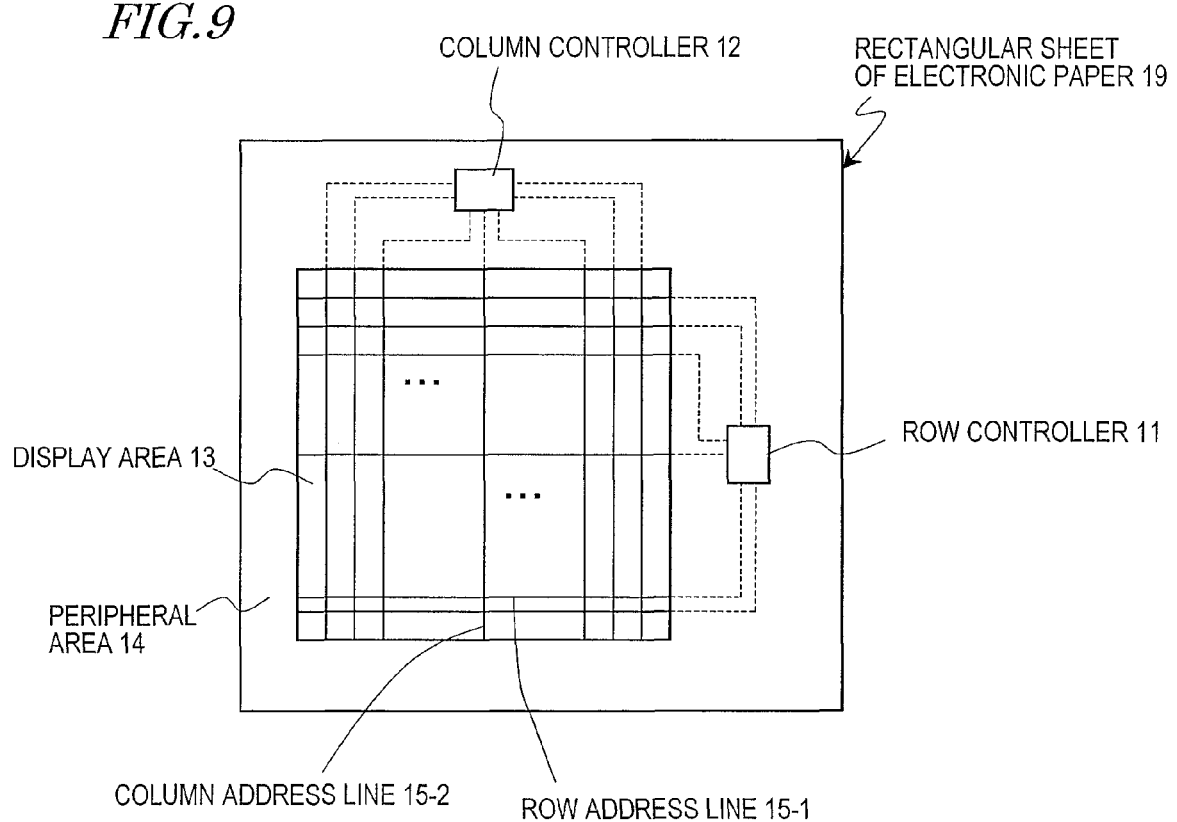
FIG. 9 illustrates a rectangular piece of electronic paper 19.

For example, a rectangular piece of electronic paper 19 is shown in FIG. 9. The rectangular piece of electronic paper 19 also includes a display area 13 and a peripheral area 14. In the display area 13, row address lines 15-1 and column address lines 15-2 are arranged in columns and rows. On the other hand, in the peripheral area 14, arranged are a row controller 11 and a column controller 12. The principle of display of the rectangular piece of electronic paper 19 and its control method are the same as those of the ringlike sheet of electronic paper described above and the description thereof will be omitted herein.

Figure 10:
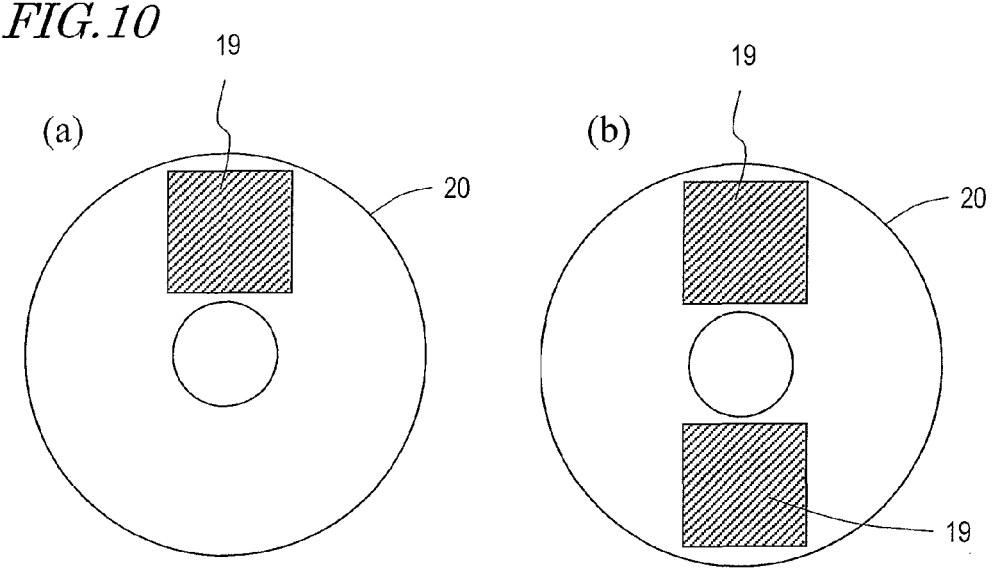
FIGS. 10(a) and 10(b) show exemplary arrangements of the rectangular piece(s) of electronic paper 19 on the BD 20.

FIGS. 10(a) and 10(b) show exemplary arrangements of the rectangular piece(s) of electronic paper 19 on the BD 20. Specifically, in FIG. 10(a), only one rectangular piece of electronic paper 19 is provided. On the other hand, in FIG. 10(b), two rectangular pieces of electronic paper 19 are arranged. The arrangement and/or the number of the rectangular pieces of electronic paper 19 may be further modified. In any case, the arrangement and the number of the group of input terminals 16 may be just as shown in any of FIGS. 5(a), 6(a), 7(a) and 8(a).

As described above, the shape of the sheet of electronic paper 10 and the shapes, arrangements and the numbers of the group of input terminals 16 and/or the group of output terminals 220 may be changed in various combinations. In the following description, the electronic paper is supposed to be a ringlike sheet and the group of input terminals 16 and the group of output terminals 220 are supposed to be arranged as shown in FIGS. 5(a) and 5(b).

3. How Optical Disk Drive Senses BD with Electronic Paper being Loaded

The recorder 100 can change the modes of operation depending on whether the BD being loaded is a BD 205a with the sheet of electronic paper 10 (i.e., the BD 20) or a BD 205a with no electronic paper 10. For example, if the BD 20 has been loaded, information about that fact may be displayed on either a TV connected to the recorder 100 or the display window (not shown) of the recorder 100. Also, the refresh control section 219 may be operated to display the title, recording date and time, and other pieces of information about a recorded content on the sheet of electronic paper 10. On the other hand, if the BD 205a with no electronic paper 10 has been loaded, the content may be recorded by a normal method without activating the refresh control section 219.

Hereinafter, it will be described in further detail with reference to FIG. 11 how the recorder 100 senses a BD with electronic paper being loaded.

Figure 11:
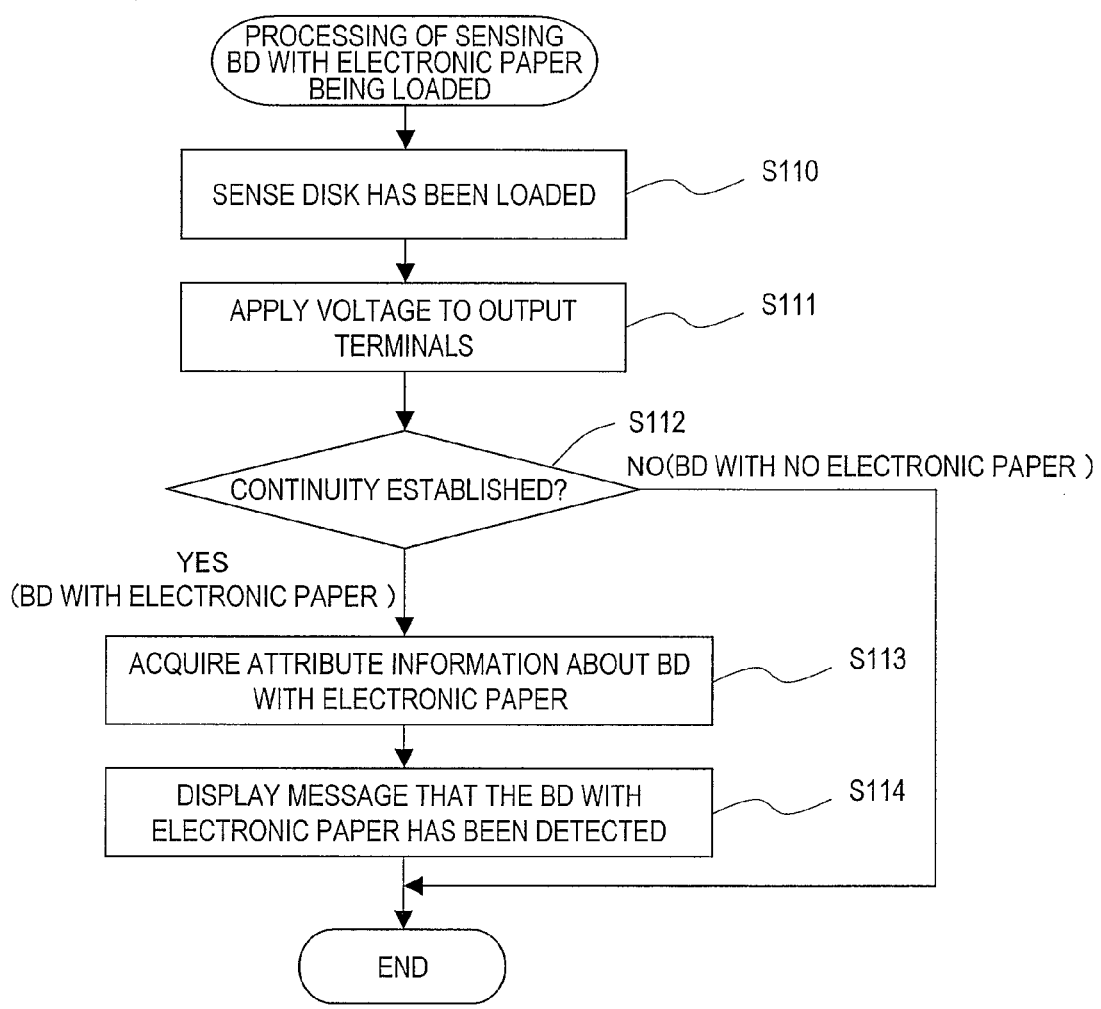
FIG. 11 is a flowchart showing the procedure of the processing of sensing whether a BD with a sheet of electronic paper has been loaded or not.

FIG. 11 shows the procedure of the processing of sensing whether a BD with a sheet of electronic paper has been loaded or not. First, in Step S110, the recorder 100 senses whether or not a disk has been inserted. If anything has been inserted on a disk tray, for example, that thing is irradiated with a laser beam after the disk tray has been housed in the recorder 100, and the reflectance is calculated based on the intensity of the reflected light. If the reflectance turns out to be equal to or higher than a predetermined value, it can be determined that a disk has been inserted. It should be noted that if a slot loading arrangement that does not use a disk tray is adopted, that thing inserted may be irradiated with a laser beam after a loading motor (not shown) has finished its operation.

If a disk has been inserted, the process advances to the next processing step S111, in which the refresh control section 219 outputs a predetermined electrical signal and applies a voltage to the group of output terminals 220. Next, in Step S112, the refresh control section 219 determines whether or not electrical continuity has been established. The electrical signal is an arbitrary signal that is output to see whether electrical continuity has been established or not.

If electrical continuity has been established, it means that the group of output terminals 220 is in contact with the group of input terminals 16. That is why the refresh control section 219 can determine that the disk inserted is a BD 205a with a sheet of electronic paper 10 (i.e., a BD 20). In that case, the process advances to Step S113.

On the other hand, if no electrical continuity has been established, then it means that the disk has no group of input terminals 16. Therefore, the refresh control section 219 determines that the disk inserted is a BD 205 with no electronic paper 10. Thereafter, the process ends.

Steps S113 and S114 are additional processing steps to be performed after the disk inserted has turned out to be the BD 20. Specifically, in Step S113, the refresh control section 219 acquires attribute information about the BD 20. Examples of the attribute information include a piece of information indicating whether the diameter of the BD 20 is 80 mm or 120 mm, a piece of information about the number of storage layers, and a piece of information indicating whether or not the disk inserted is a hybrid disk with multiple types of storage layers. These pieces of information are stored in a memory in a chip circuit on the sheet of electronic paper 10 when the BD 20 is shipped. Alternatively, that memory may also be provided as an internal memory for the row controller 11 or the column controller 12.

In Step S114, the refresh control section 219 displays a message that the BD 20 has been detected. For example, the refresh control section 219 reads message data from the program ROM 210 and instructs the graphic control section 207 to display a message "Blu-ray disc with electronic paper detected" on a TV based on that data. Optionally, the refresh control section 219 may also display a message about the diameter of the disk based on the attribute information about the BD 200.

4. Update of Information Displayed on Electronic Paper According to the Mode of Operation of the Recorder 100

While performing various types of operations, the recorder 100 updates the information to be displayed on the sheet of electronic paper according to the mode of the operation. To cover those various modes, it will be described in the following sections (4-1) through (4-6) how to update the information displayed on the electronic paper according to the mode of operation of the recorder 100. It should be noted that the single recorder 100 just needs to perform at least one, not all, of the following information update processes. The following sections (4-1) through (4-6) represent various preferred embodiments of the present invention.

(4-1) Electronic Paper's Information Update Processing while a Content is being Recorded In this preferred embodiment, the BD 205a with a sheet of electronic paper (i.e., the BD 20) is supposed to be a BD-R disk or a BD-RE disk on which data can be written.

First, it will be described with reference to FIG. 12 how the display may be refreshed. After that, it will be described with reference to FIG. 13 how the recorder 100 performs the refresh process.

Figure 12:
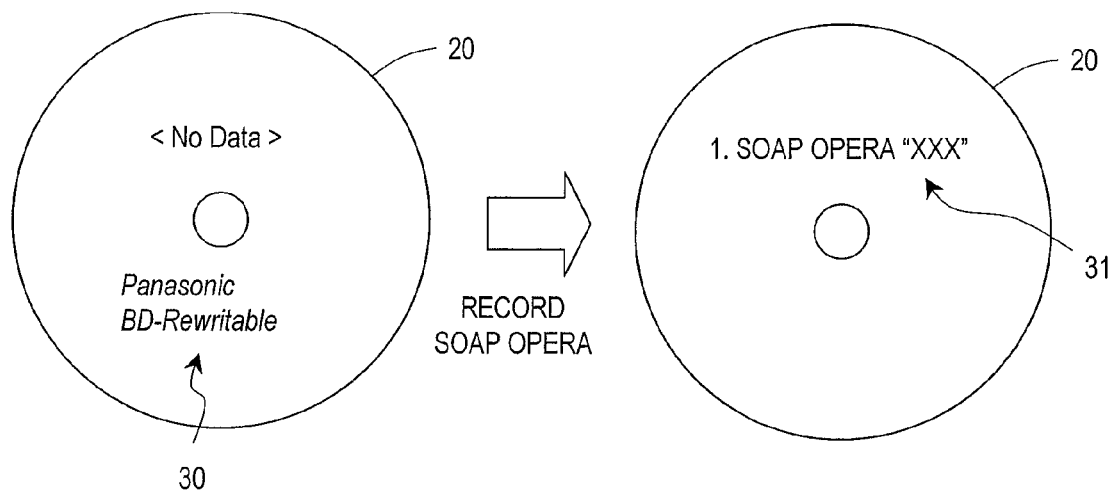
FIG. 12 shows how the display on a sheet of electronic paper may change.

FIG. 12 shows how the display on a sheet of electronic paper may change. In FIG. 12, the sheet of electronic paper 10 is supposed to cover one side of the BD 20 entirely for the sake of simplicity. The same statement will apply to all of the other similar drawings.

The recorder 100 refreshes the display on the sheet of electronic paper 10 while recording a content on the BD 20. While no data has been written there yet, maker information 30, which has been shown since the BD 20 was shipped, is still displayed.

And after a soap opera, for example, has been recorded on the BD 20, the refresh control section 219 updates the information displayed into information 31 about the serial recording number, category and title of the program recorded. Once the BD 20 has been ejected, the user can check the information 31 displayed on the sheet of electronic paper any time, and can easily see what program has been recorded.

Figure 13:
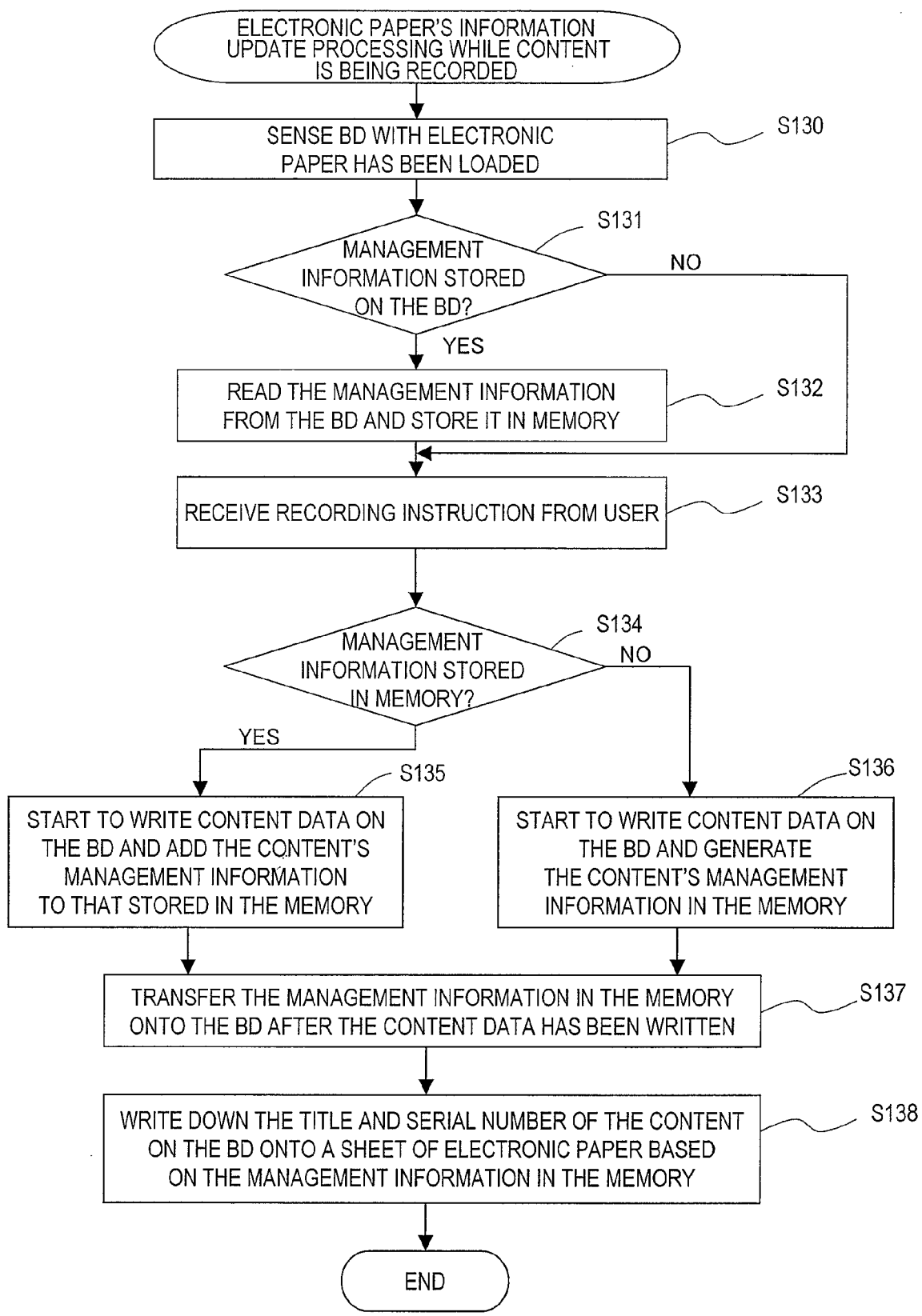
FIG. 13 is a flowchart showing the procedure of electronic paper's information update processing while a content is being recorded.

FIG. 13 shows the procedure of electronic paper's information update processing while a content is being recorded. First, in Step S130, the recorder 100 senses that a BD 20 has been loaded by performing the processing steps shown in FIG. 11.

Next, in Step S131, the TS processing section 204 determines whether or not management information is stored on the BD 20. The management information may be information stored in the management file 82, playlist file 83 or clip information file 84 shown in FIG. 16 (to be described later). If the answer is YES, the process advances to Step S132. Otherwise, the process advances to Step S133.

In Step S132, the TS processing section 204 reads the management information from the BD 20 and stores it in the RAM 212. Thereafter, in Step S133, a recording instruction is received from the user.

Next, in Step S134, it is determined whether or not management information is already present in the RAM 212. If the answer is YES, the process advances to Step S135. Otherwise, the process advances to Step S136. If content data is written on the BD 20 for the first time, no management information should be present on the BD 20 or in the RAM 212. That is why the process advances to Step S136.

In Step S135, the TS processing section 204 starts writing the program data (content data) on the BD 20 in accordance with the recording instruction and overwrites the management information of the program on the management information that is now stored in the RAM 212. As used herein, the "management information of that program" is information about the program's title that is described in a PSI/SI packet of a transport stream. Thereafter, the process advances to Step S137.

In Step S136, in accordance with the recording instruction, the TS processing section 204 starts writing the content data on the BD 20 and generates the content's management information in the RAM 212.

Then, in Step S137, the TS processing section 204 transfers the management information that has been temporarily stored in the RAM 212 onto the BD 20 after having written the content data.

In the next processing step S138, the refresh control section 219 writes down the title and serial number of the content, which has just been recorded on the BD, on the sheet of electronic paper by reference to the management information in the RAM 212. As a result, the information displayed is updated. The information being displayed on the sheet of electronic paper may be updated either right after the recording session is over or when the BD 20 is ejected for the first time after the recording session has ended.

In the example shown in FIG. 12, as the content is recorded, additional information is displayed on the sheet of electronic paper. Meanwhile, some content data may be deleted by the user. Even so, the information being displayed on the sheet of electronic paper is also updated. The management information of the deleted content is also deleted. That is why the item of information about that deleted content disappears from the sheet of electronic paper. In that case, the refresh control section 219 renumbers the existent contents and updates the information displayed on the sheet of electronic paper 10.

(4-2) Electronic Paper's Information Update Processing while a Content is being Played Back In this preferred embodiment, the BD 205a with a sheet of electronic paper (i.e., the BD 20) is supposed to be a BD-RE disk on which data is rewritable.

First, it will be described with reference to FIG. 14 how the display may be refreshed. After that, it will be described with reference to FIG. 15 how the recorder 100 performs the refresh process.

Figure 14:
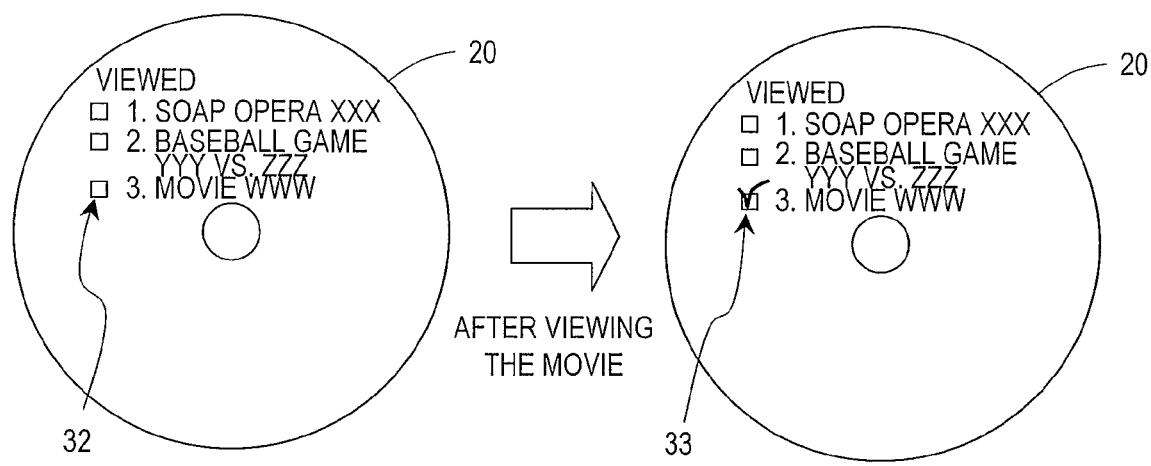
FIG. 14 shows how the display on a sheet of electronic paper may change.

FIG. 14 shows how the information being displayed on a sheet of electronic paper may change. When one of the contents stored on the BD 20 has been played back, the recorder 100 will update the information being displayed on the sheet of electronic paper 10.

Suppose information about at least one content is displayed on the sheet of electronic paper of the BD 20. FIG. 14 shows that three different contents (e.g., soap opera, baseball game, and movie programs) are now stored on the BD 20. The information about these contents is written down on the sheet of electronic paper by the method that has already been described with reference to FIGS. 12 and 13. In this example, checkboxes 32, which can be used to indicate whether the program has been viewed or not, are also shown on the sheet of electronic paper. In the example shown in FIG. 14, there are still no checkmarks in any of the checkboxes 32, which means that none of these contents have been viewed yet.

Suppose the user has just viewed the movie. Then, the refresh control section 219 refreshes the display such that a checkbox for the movie content is turned ON with a checkmark 33.

As will be described later, a flag indicating whether or not a recorded content has been viewed yet is stored as a piece of management information on a BD-RE disk. By reference to this flag, a viewed content may be checked with the additional checkmark 33. By checking out the information on the sheet of electronic paper, the user can tell easily viewed contents from unviewed ones even without loading the BD 20 into the recorder 100. That is why this technique comes in much handier for him or her.

Figure 15:
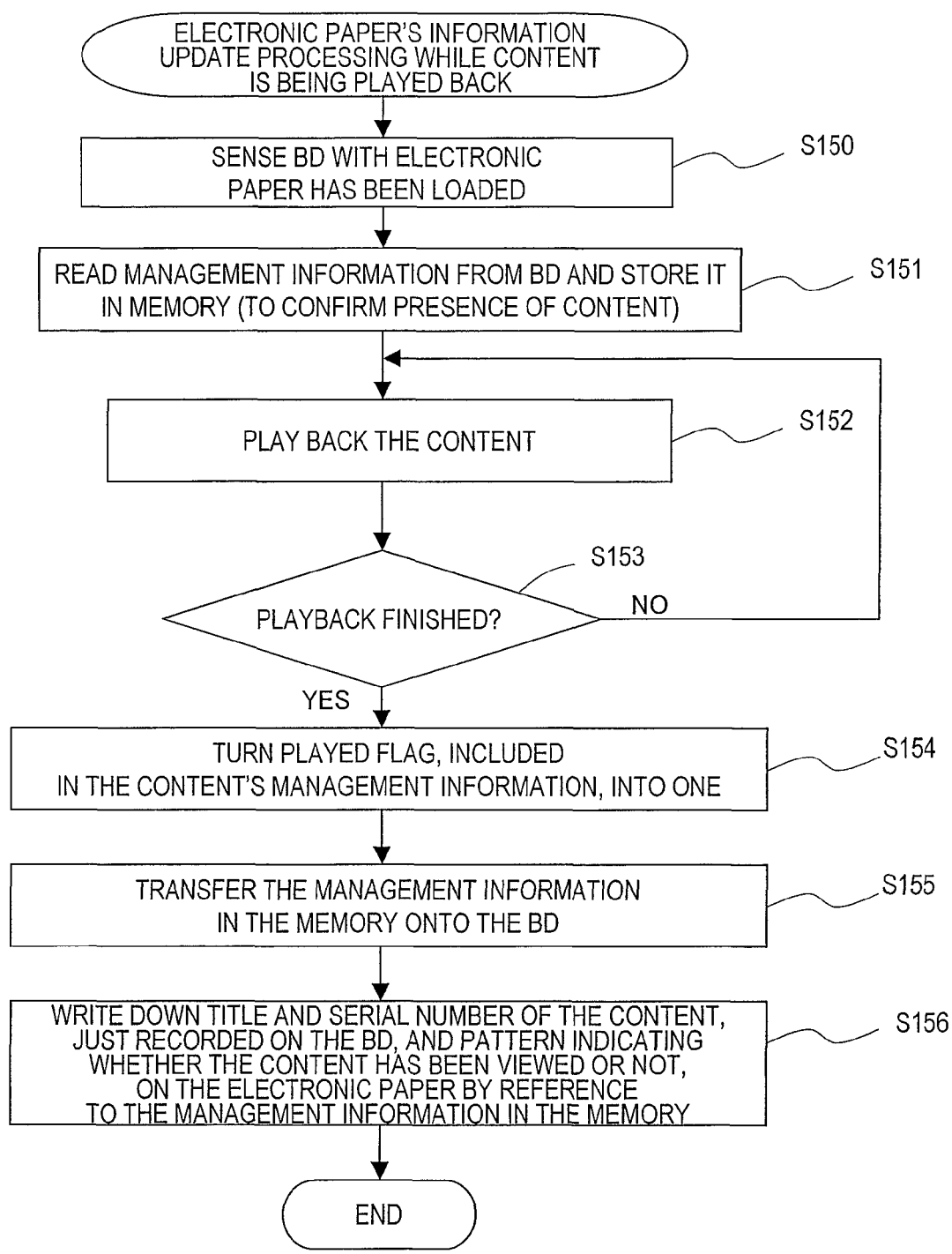
FIG. 15 is a flowchart showing the procedure of electronic paper's information update processing while a content is being played back.

FIG. 15 shows the procedure of electronic paper's information update processing while a content is being played back.

First, in Step S150, the refresh control section 219 senses that the BD 20 has been loaded by performing the process shown in FIG. 11. Next, in Step S151, the TS processing section 204 reads management information from the BD and stores it in the RAM 212. Thanks to the presence of the management information, the CPU 211 can see that a content is stored on the BD 20.

Next, in Step S152, the CPU 211 of the recorder 100 activates the TS processing section 204, the decoder 206, the graphic control section 207 and the DAC 209, thereby playing back the content from the BD 20. It should be noted that the CPU 211 starts the playback operation in accordance with the user's instruction that has been received via the instruction receiving section 215.

Then, in Step S153, the CPU 211 determines whether or not the playback operation is over. If the answer is NO, the playback operation is continued through the end. On the other hand, if the answer is YES, the process advances to Step S154.

Subsequently, in Step S154, the CPU 211 turns the played flag, included in the content's management information, into one. A data structure including the played flag will be described later. Thereafter, in Step S155, the CPU 211 transfers the management information, which has been temporarily stored in the RAM 212, onto the BD 20.

Finally, in Step S156, by reference to the management information in the RAM 212, the refresh control section 219 writes down the title and serial number of the content, which has just been recorded on the BD, and a pattern indicating whether the content has been viewed or not, on the sheet of electronic paper. As shown in FIG. 14, as for the content, of which the played flag has been turned into one, its checkbox is now ON with the checkmark 33. On the other hand, as for a content, of which the played flag has been turned into zero, its checkbox is now OFF with no checkmarks 33.

Hereinafter, the data structure of the BD 20 that realizes such processing will be described with reference to FIGS. 16 through 18. It should be noted that the following data structure does not depend on whether the BD has a sheet of electronic paper or not. Thus, the BD 205a to be described below is a more general one.

Figure 16:
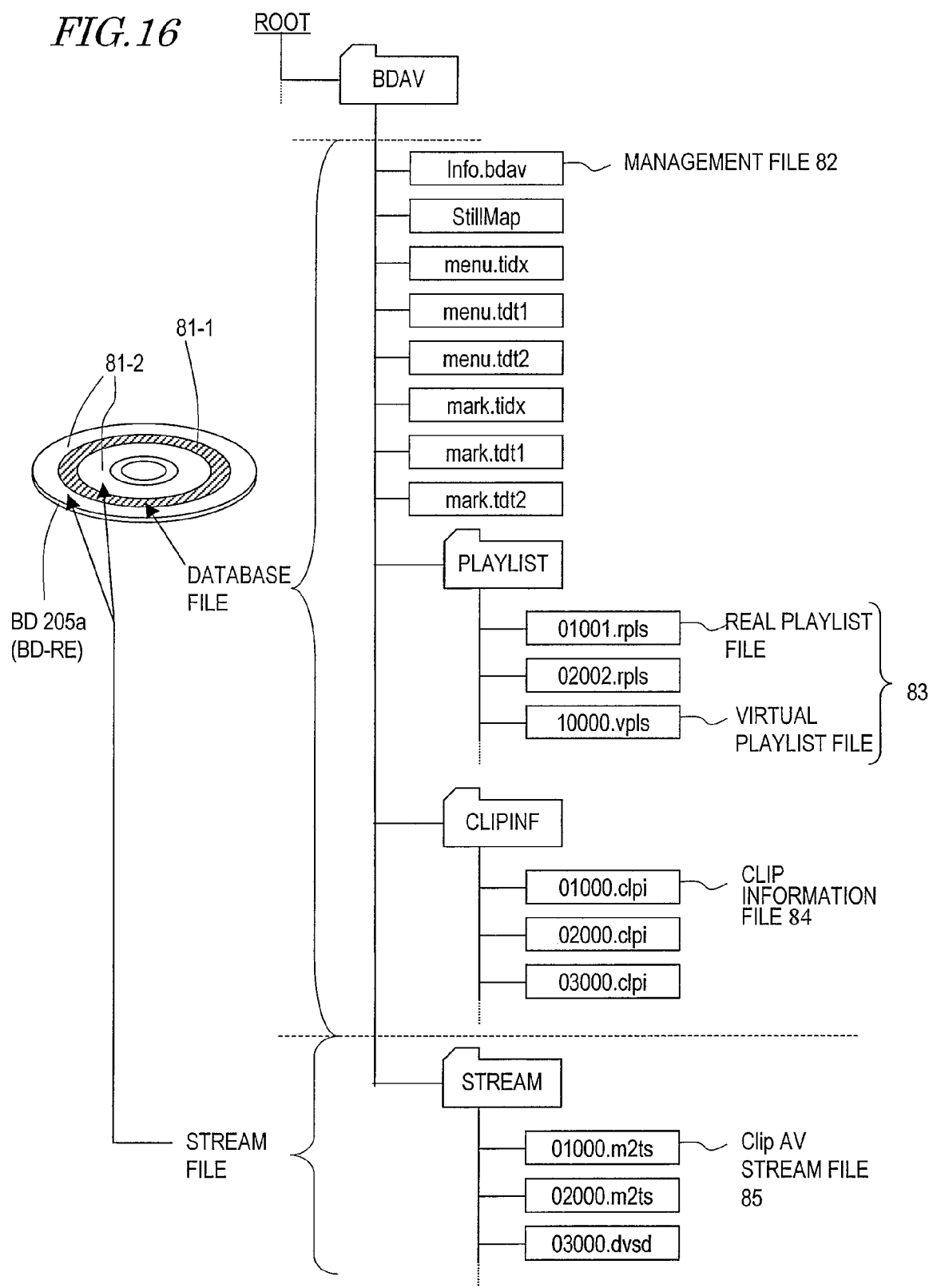
FIG. 16 shows a storage area on the BD 205a and its directory/file structure.

FIG. 16 shows a storage area on the BD 205a and its directory/file structure. The BD 205a includes a gathered file area 81-1 and a real-time data area 81-2. The gathered file area 81-1 has a storage capacity of several hundreds of megabytes. In the gathered file area 81-1, stored are management information files (or database files) for managing the playback of the clip AV stream.

As shown in FIG. 16, there are multiple types of database files including a management file (Info.bdav) 82, playlist files (01001.rpls and 10000.vpls) 83 and a clip information file (01000.clpi) 84. These files are accessed rather frequently. That is why the gathered file area 81-1 is located at the center of the storage area of the BD 205a that can be accessed efficiently.

On the other hand, the real-time data area 81-2 has a storage capacity of 23 to 27 gigabytes in a single-sided single-layer Blu-ray Disc. In the real-time data area 81-2, stored is a stream file representing the clip AV stream (e.g., a clip AV stream file (01000.m2ts) 85).

The management file 82, the playlist file 83, the clip information file 84 and clip AV stream file 85 are stored under the BDAV directory. Their correlation is as follows. Portions (a) through (d) of FIG. 17 shows a relationship between the management information and the stream data. The management information is shown in portions (a) through (c) of FIG. 17, while the stream data is shown in portion (d) of FIG. 17. Portion (a) of FIG. 17 shows a table of playlists described in the management file (Info.bdav) 82. That is to say, a table of playlist file names that signify the playlists on the BD 205a is stored in the management file 82. As used herein, the "playlist" refers to a piece of information that defines a playback route for a part or all of more than one clip AV stream.

Portion (b) of FIG. 17 shows playlists that are described in the playlist file 83 and that have extensions rpls and vpls. The playlists are classifiable into real playlists and virtual playlists. A real playlist may be generated by the recorder 100 when stream data is written for the first time, for example, and its playback route is designated from the beginning through the end of a moving picture. Meanwhile, a virtual playlist is designated by the user with respect to the stream data written, and therefore, the user can specify any locations and ranges he or she likes.

Each range of a playlist is defined by respective play items in the playlist. Specifically, the play items describe a start time (In_time) corresponding to the playback start point and an end time (Out_time) corresponding to the playback end point. The start and end times are described as presentation time stamps (PTS) specifying the presentation time of a video frame played back and the output time of an audio frame reproduced. Just after a recording operation has been finished, a real playlist usually defines only one play item to specify the start and end times of a moving picture. Meanwhile, a virtual playlist may define any number of play items. Multiple play items may be provided for a single virtual playlist and may be described so as to designate mutually different moving picture streams.

Portion (c) of FIG. 17 shows a time/address conversion table (EP_map) 84 that is described in clip information files 84 with an extension clpi. The conversion table (EP_map) 84 shows a correspondence between the presentation time of a clip AV stream and an address at which the data to be presented at that time is stored. By reference to this conversion table 84, the address in the clip AV stream, at which the data to be presented at that time is stored, can be detected based on the start time (In_time) and end time (Out_time) specified by the play item.

Portion (d) of FIG. 17 shows a moving picture stream that is stored in clip AV stream files 85 with an extension m2ts. In this portion (d) of FIG. 17, the files "01000.m2ts" and "02000.m2ts" are clip AV stream files.

As shown in portions (c) and (d) of FIG. 17, a single clip information file is provided for each single clip AV stream file on the BD 205a. Such a combination of a clip AV stream file and a clip information file will be referred to herein as a "clip".

FIG. 18 shows the information (entries) to be stored in the playlist file 83 and its data structure. In the files 83 with extensions "rpls" and "vpls", there are a plurality of entries such as UIAppInfoPlayList( ) and PlayList( ).

UIAppInfoPlayList( ) includes a playback_protect_flag field 83-1, an is_played_flag field 83-2, and a record_date_and_time information field 83-3. Among these fields, the value of the is_played_flag field 83-2 is turned into one after its associated content has been played back. Modes that use the playback_protect_flag field 83-1 and the record_date_and_time information field 83-3 will be described later.

A file with the extension "rpls" is provided for the clip AV stream file of each content. For that reason, the played flag 83-2 is also defined on a content-by-content basis.

PlayList( ) corresponds to the "playlist" described above. Play items (PlayItems) #1, 2, and so on are described as low-order entries of the playlist information (PlayList). In each of these play items, stored are the file name of a clip information file to play (Clip_Information_file_name), an identifier for identifying an STC (ref_to_STC_id), a start time (In_time), an end time (Out_time) and so on.

(4-3) Electronic Paper's Information Update Processing Using the Title ID of a Recorded Content In this preferred embodiment, the BD 205a with a sheet of electronic paper (i.e., the BD 20) is supposed to be a BD-R disk on which data can be written only once. Specifically, on a BD-R disk, data is supposed to be written in a read-only format.

First, an exemplary method of refreshing the display on a sheet of electronic paper in association with a content's recording and the data structure of the disk will be described with reference to FIGS. 19 through 21. After that, the processing of playing back a content by reference to the information being displayed on a sheet of electronic paper will be described with reference to FIG. 22.

FIG. 19 shows the flow of contents and the information being displayed on a sheet of electronic paper on the BD 20 in a situation where contents that have been recorded on a number of DVDs are stored together on a single DVD 20.

Camcorders for writing captured moving picture data on DVDs have become more and more popular these days. That is why people probably have a lot of moving pictures that are recorded on a number of DVDs. Among other things, since a single-layer DVD has a storage capacity of approximately 1.46 GB, videos that were shot on multiple different occasions such as their kids' elementary school entrance ceremony and field day could be dispersed on several DVDs. And to manage those moving pictures, the user either writes down the shooting date and time and title on a label for such DVDs or makes and attaches such labels in most cases.

Meanwhile, a BD 20 with four storage layers has a storage capacity of 100 GB, which roughly corresponds to the combined storage capacity of 68 single-layer DVDs. In managing moving pictures, it would be much more convenient for the user to save a lot of moving pictures together on a single BD 20 and get information about those recorded moving pictures displayed on a sheet of electronic paper by the recorder 100 rather than making labels for a lot of DVDs and storing them.

Therefore, by using the recorder 100, the user can copy or move the data that were written on a number of DVDs during their kids' elementary school entrance ceremony, field day and various other occasions onto the HDD 205*b* once, and then write only selected data on the BD 20 in an order he or she likes as shown in FIG. 19.

After those contents have been written, the refresh control section 219 of the recorder 100 writes down various types of information, including the contents' serial numbers 34-1, recording date 34-2 and content's name 34-3, on the sheet of electronic paper of the BD 20.

Hereinafter, the information displayed on the sheet of electronic paper will be described in detail. Supposing a moving picture that has been shot during a single video recording session (i.e., from the beginning through the end of the video recording session) is a single content, the contents' serial numbers 34-1 are used as serial numbers to identify respective contents uniquely. In FIG. 19, the contents' serial numbers 34-1 are shown as "Titles #1 through #16", which means that the video of the entrance ceremony was shot during 16 different sessions, and therefore, includes 16 different contents. On a DVD, a different MPEG-2 program stream file is generated and managed for each data captured. That is why a content can be identified on a file by file basis and may have a unique identification number.

The recording date 34-2 shows the date (month and year) when the content was recorded. These pieces of information are identified based on the information about the date of generation of an MPEG-2 program stream file and then written. Alternatively, as the DVD management information, defined by a standard, includes recording date and time information, those pieces of information may also be identified based on that information and then written. Optionally, more detailed recording date and time information may be included. The content's name 34-3 is a name that can be given arbitrarily by the user. In the example shown in FIG. 19, this set of contents is called an "entrance ceremony".

By reference to these pieces of information 34-1 through 34-3 displayed, the user can see easily what type of video was shot when and then stored there in how many titles.

It should be noted that the CPU 211 of the recorder 100 generates the contents' management information by using the respective numbers that are shown as contents' serial numbers 34-1. For example, as for a content identified by the content's serial number "10", the title ID of its management information is also "10". The title ID is content's own identification information to be provided for each content. This is advantageous because if the user who wants to get a title with the content's serial number 10 played back enters "10" using a remote, for example, the recorder 100 can search the management information using the same number as what has just been entered and can play back the content identified by that number. As there is no need to get complicated computations done to find its associated content's management information, the processing load on the CPU 211 would be very light.

FIG. 20 shows the storage areas of a BD-R and its directory/file structure in a read-only format.

In many respects, the storage areas and directory/file structure of a BD-R disk share common features with the storage areas of a BD-RE disk and its directory/file structure in its recordable format shown in FIG. 16. In the following description, those common features will be identified by the same reference numerals and the description thereof will be omitted herein.

On a BD-R, the management file 92, playlist file 83, clip information file 84 and clip AV stream file 85 are stored under the BDMV directory as shown in FIG. 17.

However, the management file 92 (Index.BDMV) describes a title ID and its associated file name. FIG. 21 shows a portion of the data structure of the management file 92. In an entry (Indexes( )) 93 included in the management file 92, there is an entry (number_of_Titles) that indicates the number of titles of the contents stored on the BD 205*a*. This entry includes a title ID field 94 and a file name field 95.

The title ID field 94 describes a title ID associated with the recorded content. The title ID may be one, two or any other numeral. In the file name field 95 on the other hand, described is the file name of the content, to which that title ID is assigned.

Every time a content is recorded, the content is given a title ID and its file name and the management file 92 is updated. The management file 92 may be updated either collectively after the content data has all been written or sequentially every time a part of content data has been written. Until the management file 92 is updated completely, the management file 92 is still retained and updated in the RAM 212.

By reference to the management file 92 in the RAM 212, the refresh control section 219 displays not only the content's name but also its title ID on the sheet of electronic paper on the BD 20.

FIG. 22 shows the procedure of playing back a content by reference to its title ID that is displayed on a sheet of electronic paper.

First, in Step S200, the instruction receiving section 215 receives a content's serial number specified by the user. By reference to the information displayed on a sheet of electronic paper, the user can specify any content's serial number he or she likes.

Next, in Step S201, the CPU 211 searches the title IDs in the number_of_Titles entry in the management file 92 using the specified content's serial number as it is as a search key. Then, in Step S202, the CPU 211 determines whether or not there is a title ID that matches the content's serial number given. If the answer is YES, the process advances to Step S203. Otherwise, the process ends without playing back the content.

In Step S203, the CPU 211 finds the file name that is associated with that title ID. Then, the CPU 211 instructs the TS processing section 204 to read that file from the BD 20. As can be seen easily from FIG. 20, the directory to store clip AV stream files has been defined. And therefore, once the file name has been found, its storage location is also known automatically.

Then, the CPU 211 activates the TS processing section 204, the decoder 206, the graphic control section 207 and the DAC 209, thereby playing back the content from the BD 20 and then the process ends.

The processing described above is an exemplary process to be done in a situation where a content needs to be played back. However, the technique described above may also be applied to identifying a content to be copied or edited, for example.

Also, in the example described above, the same number as a title ID in the management file is supposed to be displayed on a sheet of electronic paper. However, the design may be changed appropriately. For example, the content's serial number may be title ID plus one. Even so, there is no need to get complicated computations done, either, and therefore, similar effects are also achieved.

Furthermore, in the example described above, a title ID and a content's serial number are supposed to be associated with each other. However, this is just an example. Alternatively, a title ID may also be associated with the number of days that have passed since the user's child was born. For example, if the child's birthday has been entered, his or her age (or the number of days he or she has lived) is calculated based on the information about the recording date and time of the content. That is why the number of days since a child was born may be assigned as a content's title ID.

(4-4) Electronic Paper's Information Update Processing when a Request to Get Authorized to View a Locked Content is Submitted In this preferred embodiment, the BD 205*a* with a sheet of electronic paper (i.e., the BD 20) is supposed to be a BD-ROM disk. In distributing a content to users, however, the BD 205*a* with a sheet of electronic paper does not have to be a BD-ROM disk on which the content is stored but may also be a BD-R disk on which the content was recorded by the user in a read-only format.

In this example, contents that cannot be viewed unless the user is authorized to view them by paying for them are stored on the BD 20. In this case, viewable contents that have already been paid for (i.e., paid and unlocked contents) and non-viewable contents that have not been paid for yet (i.e., unpaid or locked contents) are listed in different modes on a sheet of electronic paper on the BD 20. If any of those non-viewable contents has been paid for, the recorder 100 updates the information on the electronic paper and displays the information about that content in the viewable content's mode.

Such BDs 20 may be distributed by a content provider, for example. Specifically, the content provider may store a number of movie contents on BDs 20 as locked contents and then distribute those BDs 20 to the users. Alternatively, the content provider may install a recorder for recording movie contents as locked contents at a DVD/BD store, for example. In that case, the user may bring his or her blank BD 20 to that store, select a number of movie contents he or she wants to purchase, and then record them as locked contents.

The user pays for only a movie he or she wants to view and then needs to get authorized to view it using the recorder 100 at his or her home through the processing described above. In this manner, he or she can enjoy that movie. Since a viewable content is easily identifiable on the sheet of electronic paper on the BD 20, he or she is ready to check out any time which content is viewable.

FIG. 23 shows how the information displayed on a sheet of electronic paper changes when an unpaid content is paid for.

In the beginning, two paid and unlocked contents 35 and two unpaid contents 36 are stored on the BD 20. Those contents are numbered sequentially. In the following example, movie contents #1 and #2 are supposed to be paid and unlocked contents 35 and movie contents #3 and #4 are supposed to be unpaid contents 36.

The category and titles of the paid and unlocked contents 35 are displayed clearly as solid black letters. On the other hand, the category and titles of the unpaid contents 36 are displayed in a different fashion from the solid black letters (e.g., as dotted letters or as letters in a lighter shade such as gray). Alternatively, a message telling that those are unpaid contents may also be displayed as solid black letters. Since the modes of display on the sheet of electronic paper are quite different or the status of a content can be clearly seen by looking at the appearance of its character string, the user can see which contents are viewable and which contents are not at a glance.

Suppose the user has paid for content #3 and has been authorized to view it. Then, the refresh control section 219 of the recorder 100 refreshes the display on the sheet of electronic paper such that the information about that content #3 is displayed as solid letters.

FIG. 24 shows the procedure of getting a locked content unlocked and updating the information displayed on a sheet of electronic paper. First, in Step S240, the recorder 100 senses that a BD 20 has been loaded by performing the process shown in FIG. 11. Next, in Step S241, the TS processing section 204 reads the management information from the BD and temporarily stores it in the RAM 212. Since there is the management information, the CPU 211 can see that a content is stored on that BD 20. AACS is defined as a copyright protection standard for BDs and a file dedicated to storing management information about the copyright protection of respective contents has been recorded on the BD. Management information about the locked contents is also stored in the dedicated file. That is why by reference to that dedicated file, the CPU 211 can sense the presence of the locked content. Optionally, by setting a flag value that restricts playback in the playback protect flag field 83-1 of the locked content's management information (i.e., the playlist file 83 shown in FIG. 18) that is described in the playlist file 83 of the BD 20, the CPU 211 may sense the presence of the locked content, too.

Next, in Step S242, the instruction receiving section 215 receives a request to get authorized to view the locked content from the user.

Subsequently, in Step S243, the CPU 211 prompts the user to enter billing information showing whether the content has been paid for or not. As used herein, the "billing information" is a piece of information about whether or not a content has been paid for. For example, the billing information may be the key number of an authorization key to be distributed to only users who have already paid for a content.

Thereafter, in Step S244, in response to the reception of the billing information from the user, the CPU 211 determines whether or not the content has actually been paid for. This decision can be made by describing the key number in the management information in advance and determining whether or not the billing information entered matches that key number. If the answer is YES, it is determined that the content has already been paid for, the user is authorized to view the just unlocked content, and then the process advances to Step S245. Otherwise, it is determined that the content has not been paid for yet, the user is not authorized to view the locked content and the process goes back to the processing step S243, in which the CPU 211 prompts the user to enter billing information again.

Finally, in Step S245, the refresh control section 219 updates the information displayed on the sheet of electronic paper and displays the information about the unlocked content as solid black letters to end the process. After the content has been unlocked and the information displayed on the sheet of electronic paper has been updated in this manner, that content starts to be played back.

In the processing steps S243 and S244 described above, the CPU 211 prompts the user to enter the billing information and determines, based on the billing information, whether or not the content in question has been paid for. However, a different method may also be adopted.

For example, the CPU 211 may require the user to enter identification information, which may be his or her own name or a user ID that has been given to him or her in advance. Then, the CPU 211 accesses the content provider's server (not shown), which is connected to the network 101, and acquires billing information by way of the network control section 214.

If the user has already paid for the content, then billing information showing that he or she has paid for the content should be stored in association with his or her identification information. On the other hand, if the user has not paid for the content yet, then billing information showing that he or she has not paid for the content yet should be stored in association with his or her identification information. In any case, the CPU 211 can determine based on this billing information whether or not the user has paid for the content.

It should be noted that any type of information about the content could be displayed. For example, the information may also be a thumbnail picture. As another alternative, only information about paid and unlocked contents 35 may be displayed on the sheet of electronic paper with no information about unpaid contents 36 shown. In that case, when the BD 20 is loaded into the recorder 100, the information about the unpaid contents may come up for the first time and the user may perform the purchasing and authorization procedure using the recorder 100.

Also, suppose contents #1 through #3 representing a series of movies are stored. In that case, if the user has been authorized to view content #1, then the information about that content #1 may be displayed clearly and information about the presence of its sequels (i.e., contents #2 and #3) such as the thumbnails or the title images of the sequels #2 and #3 may be displayed.

Optionally, subtitles of a movie may be purchased as an additional content. Suppose Japanese subtitles are stored as a content on the BD 20 in advance. In that case, if the user has purchased the Japanese subtitle content and has been authorized to view them, then the letters "Japanese subtitles" may be displayed in solid black on the sheet of electronic paper. On the other hand, even if no Japanese subtitles are stored as a content on the BD 20 in advance, the user may also purchase Japanese subtitle data and get it downloaded and stored on the HDD 205*b* of the recorder 100. Even so, the letters "Japanese subtitles" or the name of the device on which the subtitles are stored may be displayed in solid black on the sheet of electronic paper.

Billing may also be made in various manners. For example, if the user has brought his or her blank BD 20 to the store to have a locked content recorded on it, some discount may be made on the charge. Particularly when the BD 20 has an attached sheet of electronic paper, the charge may be further discounted. Optionally, the processing described above may also be applied to a situation where a content's copying is managed depending on whether or not the content has been paid for. That is to say, if the user has been authorized to copy it, the content's information may be displayed in solid black. On the other hand, if the user has not been authorized to copy it, then its information may be displayed as dotted letters in gray or a message telling that the content has not been unlocked yet may be displayed in solid black letters.

In the processing described above, the modes of display on the sheet of electronic paper are changed according to the type of the content that is determined by whether or not the content has been paid for. Alternatively, the modes of display on the sheet of electronic paper may also be changed according to the period in which the content is viewable. Hereinafter, it will be described with reference to FIGS. 25(*a*) through 25(*d*) how to change the modes of display with the period in which a given content is viewable.

Figure 25:
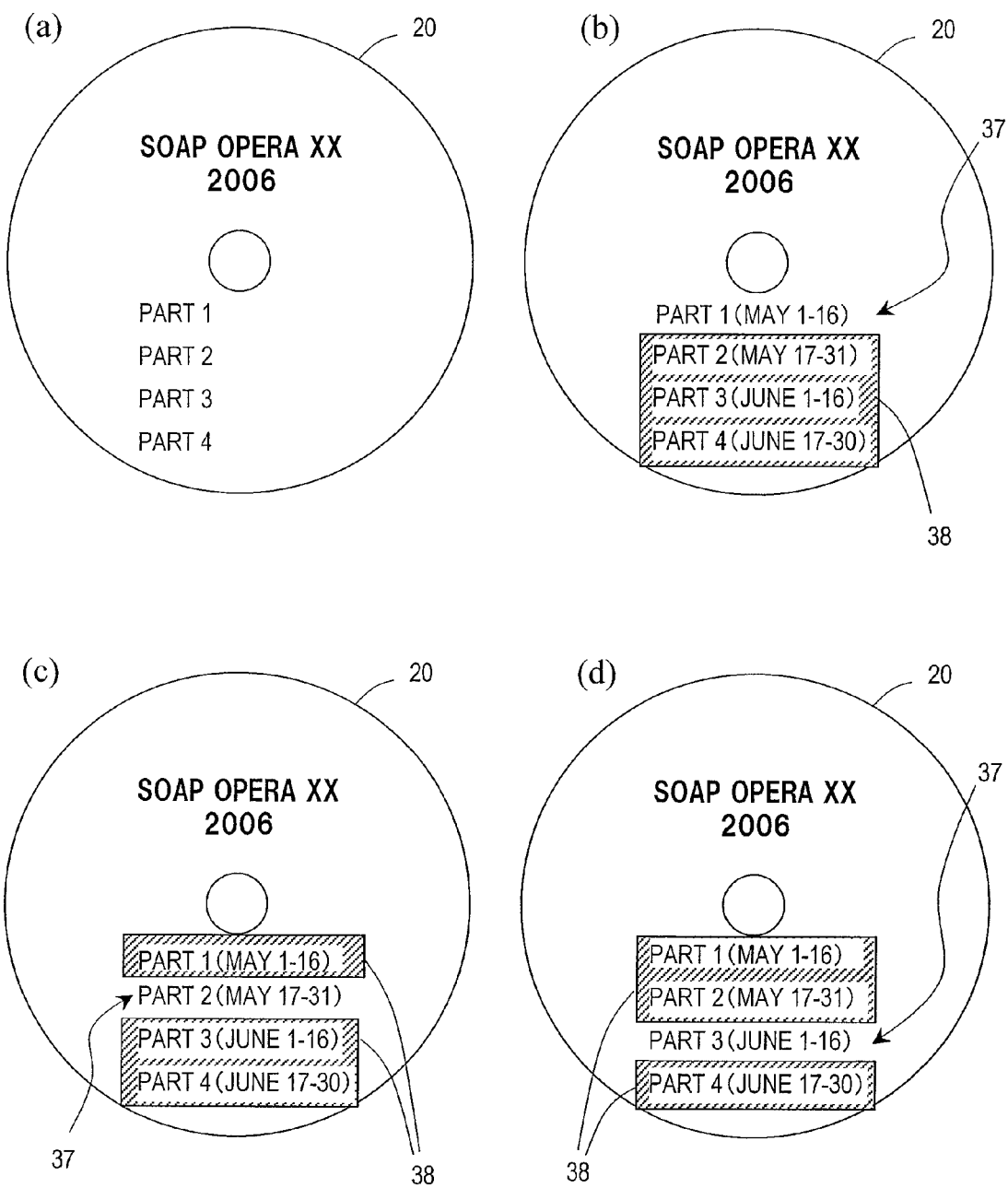

First, FIG. 25(*a*) shows an example of information displayed about contents that are viewable at any time. Four contents, representing the first through fourth parts of a soap opera, are stored on the BD 20. The same four contents are supposed to be stored in each of the other BDs 20 shown in FIGS. 25(*b*) through 25(*d*).

FIGS. 25(*b*) through 25(*d*) are three examples showing how to display information 37 about a viewable content and information 38 about non-viewable contents. Specifically, FIG. 25(*b*) shows that only the first part is viewable from May 1 through May 16. On the other hand, the second through fourth parts are not available during that period. Such a control is needed when this soap opera is distributed as BDs 20 and broadcast as a TV program at the same time. That is to say, this control should be performed to prevent the users from playing back a non-viewable content from the BD 20 before that part is telecast. In FIGS. 25(*c*) and 25(*d*), information about a viewable content during a specific period of time is also displayed in the same way.

The periods in which these contents are viewable are described in a file dedicated to storing management information for the copyright protection of those contents. By reference to that file, the player can determine whether each content is viewable or not. Optionally, the network address of a particular server may be described in the dedicated file. In that case, the player may access the server with that address to inquire whether the content is available or not. The player may play back the content on receiving a response that accommodates the request but may not play back the content on receiving either a response that denies the request or no response at all.

(4-5) Electronic Paper's Information Update Processing while the Disk is being Formatted In this preferred embodiment, the BD 205*a* with a sheet of electronic paper (i.e., the BD 20) is supposed to be a BD-RE disk.

A BD-RE disk is rewritable. That is why once a content recorded on a BD-RE disk has been viewed, the disk may be turned into a blank disk by subjecting it to formatting (initializing) processing and then a new content may be recorded there.

As already described for the item (4-1), the recorder 100 updates the information displayed on the sheet of electronic paper in associated with the content recorded. However, once the disk is subjected to the formatting processing, no content is stored there anymore. That is why it should be determined what type of information needs to be displayed on the sheet of electronic paper 10 and how to get the information to be displayed.

FIG. 26 shows how the information displayed on the sheet of electronic paper changes before and after the BD 20 is subjected to formatting processing. Before the formatting processing, various sorts of information 39 about the recorded contents is displayed on the sheet of electronic paper. After the formatting processing, however, other types of information 40 such as the manufacturer's advertisements or announcements are displayed. As used herein, the formatting processing refers to erasing data from the data area (see FIG. 5(*a*)) of the BD 205*a* that forms part of the BD 20.

FIG. 27(*a*) shows a ROM 17 that is built in a sheet of electronic paper. The built-in ROM 17 is connected in a readable state to the controllers 11 and 12 and stores image data to be displayed on a sheet of electronic paper after the BD 20 has been subjected to the formatting processing. After the formatting processing, the controllers 11 and 12 read the image data and display it on the sheet of electronic paper.

FIG. 27(b) shows the arrangement of a lead-in 96 on the BD 205a that forms part of the BD 20. The lead-in 96 is an area, which includes the innermost portion of the BD 205a and in which data other than user data is supposed to be written.

The lead-in 96 includes a disk information area in which parameters needed in accessing the data on the disk are stored. In this disk information area, the network address information 97 is described. This network address may be assigned to the server of a disk maker on the Internet, and that server stores the image data to be displayed on a sheet of electronic paper after the BD 20 has been subjected to the formatting processing.

FIG. 28 shows the procedure of performing the electronic paper's information update processing during formatting by using the configuration shown in FIG. 27(a).

First, in Step S280, the recorder 100 senses that the BD 20 has been loaded by performing the processing shown in FIG. 11. In the next processing step S281, the instruction receiving section 215 receives a request to format the BD 20 from the user. In response to the formatting request, the CPU 211 instructs the TS processing section 204 to subject the data area of the BD 20 to formatting processing.

Subsequently, in Step S283, the refresh control section 219 instructs the controllers 11 and 12 for the electronic paper to display an image based on the image data that is stored in the ROM 17 built in the sheet of electronic paper.

FIG. 29 shows the procedure of performing the electronic paper's information update processing during formatting by using the configuration shown in FIG. 27(b). The processing steps S290 through S292 are respectively identical with the processing steps S280 through S282 shown in FIG. 28, and the description thereof will be omitted herein.

In Step S293, the TS processing section 204 reads the network address from the lead-in of the BD. In the next processing step S294, the CPU 211 accesses the server, to which the network address is assigned, by using the network control section 214 and gets the image data from that server.

Then, in Step S295, the refresh control section 219 instructs the controllers 11 and 12 for the electronic paper to display an image based on that image data.

As a result of the processing shown in FIG. 28 or 29, after the BD 20 has been formatted, the information 40 representing the manufacturer's advertisement or announcement is displayed based on the image data on the sheet of electronic paper.

(4-6) Area-by-area Information Update Processing on a Sheet of Electronic Paper with a Plurality of Display Areas In this preferred embodiment, the BD 205a with a sheet of electronic paper (i.e., the BD 20) is supposed to be a BD-R disk or a BD-RE disk on which data can be written.

On the sheet of electronic paper of the BD 20, defined are an area to display information about a content and an area to display advertisements. These areas may be defined by a number of physically separated pieces of electronic paper as shown in FIG. 10(b). Alternatively, these areas may also be defined by having the controllers 11 and 12 make rendering on different portions of the display area 13 on the same sheet of electronic paper. The latter method will be adopted in the following example.

FIG. 30 shows how the information displayed on multiple display areas is updated independently of each other as the processing advances. First, on the sheet of electronic paper of the BD 20, defined are a label information area 10a to display content's information and an area 10b to display information that has nothing to do with any content. In the following description, the area 10b will be referred to herein as an "advertisement area" 10b to display advertisements placed by the manufacturer of the device or the maker of the disk.

In FIG. 30, the upper half of the sheet of electronic paper is the label information area 10a while the lower half thereof is the advertisement area 10b. A piece of information <No data> 41 indicating that there is no data stored on the disk is now displayed in the label information area 10a. Meanwhile, advertisement information 42 about the manufacturer's new product is now displayed in the advertisement information area 10b.

Suppose the recorder 100 is going to record a soap opera program as a content. In that case, the recorder 100 performs the processing that has already been described for (4-1) to update the information displayed in the label information area 10a. As a result, a new piece of information 41' about the title and serial number of the content that has been recorded on the BD is now displayed in the label information area 10a.

Meanwhile, the advertisement information 42 in the advertisement area 10b is not changed but maintained as it is. This state is realized by making the row controller 11 or the column controller 12 apply no voltage to the address lines 15-1 and 15-2 that pass through only the advertisement area 42. Unless a voltage is applied, no external electric field is applied to the particles to be driven by the address lines, and therefore, the state of those particles does not change.

Next, suppose a situation where after the soap opera has been recorded, the recorder 100 receives another piece of advertisement information by way of the network control section 214 and updates the advertisement information. In that case, the refresh control section 219 of the recorder 100 is provided with the advertisement data that has been received via the network control section 214 and updates the information displayed in the advertisement area 10b. As a result, a new piece of advertisement information 42' is now displayed in the advertisement area 10b. Meanwhile, the information 41' displayed in the label information area 10a remained unchanged.

It should be noted that the advertisement information could be acquired by any method. For example, the advertisement information may be acquired by making the network control section 214 access the manufacturer's server (not shown) at a predetermined timing. Or the advertisement information may be updated with advertisement information that has been distributed by the manufacturer's server.

5. How the Optical Disk Drive Controls the Timing to Write Down on a Sheet of Electronic Paper of a BD The preferred embodiment to be described below relates to the timing to write down data on a sheet of electronic paper. The write down timing control of this preferred embodiment is particularly effective if the liquid in the microcapsules and the charged particles have mutually different specific gravities in a sheet of electronic paper. If the specific gravities were different, the information displayed could collapse due to the influence of centrifugal force produced by the rotation of the disk. That is why the timing to write down data is important.

As described above, the information displayed on a sheet of electronic paper may be updated even while its disk is rotating. While the disk is spinning at high velocities, however, the influence of centrifugal force is so significant that the information displayed might collapse. That is why on being notified by the drive that the number of revolutions of the disk has decreased to a predetermined value or less while the disk is going to be ejected, the refresh control section 219 may refresh the display on the sheet of electronic paper.

On the other hand, right after a disk has been inserted, the recorder 100 rotates the disk at relatively high velocities to read data from it. In that case, the information displayed on a sheet of electronic paper might collapse due to the centrifugal force produced by the rotation.

In view of these considerations, the information displayed on the sheet of electronic paper is preferably stored as bitmap data, for example, in a memory in a chip circuit included in the sheet of electronic paper 10. As for a recordable disk such as a BD-R or a BD-RE, the bitmap data may also be stored in its storage layer. Optionally, when the number of revolutions of the disk being ejected decreases to a predetermined value or less, the refresh control section 219 may write down the same information on the sheet of electronic paper all over again based on that data. When an additional content is written on the disk, for example, the information displayed needs to be updated. In that case, the refresh control section 219 may update the information into the latest one including the information about the content just added and may overwrite the bitmap data representing the latest information on the previous one that is stored in the memory of the chip circuit included in the sheet of electronic paper 10.

The timing to write down on the sheet of electronic paper may be either set by the user on the recorder 100 or determined automatically by the recorder 100 by itself.

For example, if the operating instruction of the BD 20 requires that the information be written down on the sheet of electronic paper while the disk is being ejected, then the user may set the timing such that information is written down on the sheet of electronic paper while its disk is being ejected. And the recorder 100 updates the information displayed on the sheet of electronic paper 10 at the specified timing.

On the other hand, if the controllers 11 and 12 (see FIGS. 4 and 9) on the sheet of electronic paper or the ROM 17 (see FIG. 27) built in the sheet of electronic paper stores information specifying the timing to write down on the sheet of electronic paper or information about the specific gravity of the particles in the sheet of electronic paper, the recorder 100 can control the timing to write down on the sheet of electronic paper based on that information. For example, if the specific gravity of the particles is greater than a threshold value, the influence of the centrifugal force becomes significant. In that case, the information should be written down on the sheet of electronic paper while the disk is being ejected.

If the information displayed on the sheet of electronic paper 10 is updated while the disk is being ejected, the entire information is updated at once. Unless the information displayed on the sheet of electronic paper is updated while the disk is being ejected, the information displayed on the sheet of electronic paper may be updated every time a content is recorded on the BD 20, for example.

In the preferred embodiments described above, the information displayed on the sheet of electronic paper is supposed to be updated by the device by collecting every piece of necessary information from the management information each time, for example. However, if the BD 205a is a recordable disk such as a BD-RE disk or a BD-R disk, data representing the information displayed on the sheet of electronic paper may be stored in its data area. Then there is no need for the device to collect every piece of necessary information whenever information needs to be updated. As a result, the processing can be done more quickly.

Also, the preferred embodiments described above are supposed to be applied to a BD with an attached sheet of electronic paper. However, the BD may be replaced with an HD-DVD, a DVD or a CD.

The present invention is also applicable to a situation where a content is recorded on an HDD using a recorder with the HDD built in. For example, a sheet of electronic paper 10 may be provided for either the recorder itself or a TV set that is connected to the recorder to display the serial numbers and titles of programs recorded. In this case, the serial numbers displayed are associated with title IDs in the management information as already described for the item (4-3). When the user presses down a button on a remote that corresponds with the serial number of a program to play back, a recorded program, identified by that serial number, starts to be played back. In this manner, the user can view the program he or she selected by doing a simple operation.

It should be noted that if a sheet of electronic paper is provided for either the recorder itself or a TV that is connected to the recorder, then the sheet of electronic paper 10 could include an infrared ray receiving section such that any arbitrary information could be written down on the sheet of electronic paper using the infrared transmission function of a cellphone, for example. Alternatively, a wireless telecommunications technique other than infrared transmission may also be adopted.

Industrial Applicability

The disk drive of the present invention can refresh the display on a sheet of electronic paper using a very simple configuration. Also, the data processor of the present invention controls the display on a sheet of electronic paper in close association with a content that is stored on a storage medium, and therefore, detailed information about the recorded content can be checked out easily, thus providing a storage medium that comes in much handier for users.

The invention claimed is:

1. A data processor for writing data on a data area of a storage medium having content data representing a content, the processor comprising:
   a drive to be loaded with the storage medium in a removable position;
   a control section, which is provided for one of the storage medium, the data processor itself, and a display device connected to the data processor and which is electrically connected to electronic paper, on which information displayed is updatable, and controls update of information displayed on the electronic paper; and
   a processing section, which reproduces the content data written on the storage medium and which generates information representing a title of the content, which is the content's own identification information based on the content data,
   wherein, when reproduction of the content is finished, the control section writes the title of the content and a description indicating that the content has been viewed on the electronic paper.

2. The data processor of claim 1,
   wherein the description is a checkmark.

3. The data processor of claim 1, wherein the storage medium has a flag data indicating whether or not the content has been viewed, and
   wherein when the reproduction of the content is finished, the processing section changes the flag data indicating that the content has been viewed.

4. The data processor of claim 1, wherein the control section updates the title of the content and the description displayed on the electronic paper after the control section has been instructed to eject the storage medium but before the control section actually ejects the storage medium.

5. A data processor for reading and/or writing content data from/on a data area of an optical disk,
   wherein electronic paper, which turns with the optical disk and on which information displayed is updatable, is provided for the optical disk, and wherein the information displayed on the electronic paper is updated when a voltage is applied to the paper but is unchanged when no voltage is applied to the paper, and wherein the data processor comprises:

a drive to be loaded with the optical disk in a removable position; and a control section, which is electrically connected to the electronic paper provided for the optical disk, and controls update of information displayed on the electronic paper by regulating the voltage applied, wherein the electronic paper stores information about the specific gravity of particles in the electronic paper, and wherein when the number of revolutions of the optical disk decreases to a predetermined value or less, the control section updates the information displayed on the electronic paper by reference to the number of revolutions of the optical disk and the information about the specific gravity of the particles in the electronic paper.

6. The data processor of claim 5, wherein the control section updates the information displayed on the electronic paper after the control section has been instructed to eject the optical disk and when the control section is notified by the drive that the number of revolutions of the optical disk has decreased to the predetermined value or less.

7. The data processor of claim 5, wherein the control section controls the update of information displayed on the electronic paper based on data representing the information displayed on the electronic paper.

8. The data processor of claim 5, wherein when the content data is written on the data area, the control section updates the information displayed on the electronic paper into the latest information including information about the content just written and also updates the data representing the information displayed on the electronic paper.

9. The data processor of claim 7, wherein the control section stores the data, representing the information displayed on the electronic paper, on the optical disk.

10. The data processor of claim 8, wherein the control section stores the data, representing the information displayed on the electronic paper, on the optical disk.

11. The data processor of claim 7, wherein the electronic paper has a memory, and wherein the control section stores the data, representing the information displayed on the electronic paper, in the memory.

12. The data processor of claim 8, wherein the electronic paper has a memory, and wherein the control section stores the data, representing the information displayed on the electronic paper, in the memory.

13. The data processor of claim 1, wherein the content is audiovisual program content.

14. The data processor of claim 1, wherein the content is still picture data.

* * * * *